US012282158B2

(12) United States Patent
Gertners et al.

(10) Patent No.: US 12,282,158 B2
(45) Date of Patent: Apr. 22, 2025

(54) OPTICAL ELEMENT FOR EXPANDING AND UNIFORMING BEAM OF LIGHT

(71) Applicant: Lightspace Technologies, SIA, Marupes novads (LV)

(72) Inventors: Ugis Gertners, Riga (LV); Ilmars Osmanis, Mārupes novads (LV); Martins Narels, Riga (LV); Ainars Ozols, Siguldas novads (LV); Sandra Balode, Ogres novads (LV); Roberts Zabels, Riga (LV)

(73) Assignee: Lightspace Technologies, SIA, Marupes novads (LV)

( * ) Notice: Subject to any disclaimer, the term of this patent is extended or adjusted under 35 U.S.C. 154(b) by 592 days.

(21) Appl. No.: 17/514,679

(22) Filed: Oct. 29, 2021

(65) Prior Publication Data
US 2023/0133231 A1 May 4, 2023

(51) Int. Cl.
*G02B 27/00* (2006.01)
*G02B 27/01* (2006.01)
*G02B 27/10* (2006.01)

(52) U.S. Cl.
CPC ..... *G02B 27/0081* (2013.01); *G02B 27/0172* (2013.01); *G02B 27/1006* (2013.01)

(58) Field of Classification Search
CPC .............. B29D 11/00; B29D 11/00355; B29D 11/00682; G02B 6/00; G02B 6/0005; G02B 6/0011; G02B 6/002; G02B 6/0045; G02B 6/0053; G02B 6/0055; G02B 27/01; G02B 27/0081; G02B 27/09; G02B 27/0101; G02B 27/0106; G02B 27/0141; G02B 27/1006; G03B 21/005; G03B 21/006; G03B 21/008; G03B 21/28; G03B 21/145; G03B 21/2053; G03B 21/2066
See application file for complete search history.

(56) References Cited

U.S. PATENT DOCUMENTS

| 2007/0132964 | A1* | 6/2007 | Segler | G03B 21/10 353/78 |
| 2008/0247016 | A1* | 10/2008 | Facius | G03B 33/12 359/15 |
| 2016/0067931 | A1* | 3/2016 | Yang | B26D 3/06 428/156 |
| 2018/0052501 | A1* | 2/2018 | Jones, Jr. | H05K 7/20963 |

(Continued)

FOREIGN PATENT DOCUMENTS

RU 2757071 C1 10/2021

OTHER PUBLICATIONS

European Patent Office, Notification of Transmittal of the International Search Report and the Written Opinion of the International Searching Authority, International Application No. PCT/EP2022/078251; Date of Mailing: Feb. 6, 2023, 13 pages.

*Primary Examiner* — Sultan Chowdhury
(74) *Attorney, Agent, or Firm* — Ziegler IP Law Group, LLC.

(57) ABSTRACT

An optical element for expanding and uniforming a beam of light. The optical element includes a plurality of layers of a first type and plurality of layers of a second type arranged as a stack of layers. The stack of layers includes an input facet for receiving a beam of light and an output facet to output expanded and uniformed beam of light. The stack of layers forms a right triangular prism having a first side and a second side of a same width.

20 Claims, 14 Drawing Sheets

(56) References Cited

U.S. PATENT DOCUMENTS

| | | | | |
|---|---|---|---|---|
| 2018/0246333 A1* | 8/2018 | Cheng | ................. | G02B 6/0055 |
| 2019/0094449 A1* | 3/2019 | Ma | ...................... | G02B 6/0053 |
| 2020/0150332 A1 | 5/2020 | Nakamura et al. | | |
| 2020/0278498 A1 | 9/2020 | Schultz et al. | | |
| 2021/0405362 A1* | 12/2021 | Shi | ........................ | B60K 35/00 |

\* cited by examiner

OPTICAL ELEMENT FOR EXPANDING AND UNIFORMING BEAM OF LIGHT

TECHNICAL FIELD

The present disclosure relates generally to display devices, and more specifically to an optical element for expanding and uniforming a beam of light. The present disclosure also relates to an apparatus for expanding and uniforming a light beam and a method of manufacturing an optical element for expanding and uniforming a beam of light.

BACKGROUND

Generally, presenting three-dimensional image to the eyes of user is challenging. Most widely used method for such purpose employs stereoscopic displays. Current stereoscopic displays are predominant in head-mounted displays of virtual and augmented reality. Nevertheless, such devices typically utilize a single focal plane, that is, a single display for each of the eyes or a single display for both eyes which causes a serious deviation from a way how people visually perceive real world. Thus, in order to observe a sharp image, eyes have to accommodate on a display plane at all times. Through binocular disparity, a vergence mechanism adjusts eyes similar as it would be when viewing the real world. As a result, unnaturalistic condition of decoupling vergence and accommodation mechanism occurs, which has multiple adverse effects. For instance, accommodation and retinal blur is a strong depth cue at close distances, which is eliminated through such display architecture. Also, the mismatch between accommodation and vergence increases rapidly at closer object distances. That is, when viewing a close content, the vergence-accommodation conflict arises and causes excessive strain on the eyes, which in turn result in onset of visual fatigue or in cases of excessively large mismatch greater than 1.5 Diopters, causes a perceived image to become blurry due to inability to hold a fixation of accommodation on the display.

A technique involving multi-focal display architecture that is specifically based on optical diffuser technology and utilizes multiple (at least two) transparent displays, is implemented for mitigating such challenges. Herein, the multiple transparent displays may be selectively and rapidly activated to become light-scattering and similarly configured back to their transparent state. The technical challenge with the multi-focal display architecture is that the multi-focal display architecture requires an image projector unit with large depth of focus to ensure sharp image on all display elements. Moreover, an optical engine of the image projector unit has to be efficient, to provide bright and vivid image without excessive heat dissipation. This is of high importance, when considering primary target application in head-mounted or near-to-eye displays so as to not cause physical discomfort via heat to the user. Furthermore, the footprint of the image projector unit has to be as small as possible to in order accommodate the image projector unit in lightweight glasses-format augmented and virtual reality displays. Also, the image projector unit must ensure fast refresh rates, as the multiple transparent displays inherently have to be operated time-sequentially.

Generally, the multi-focal display architecture relies on classical micro-projection units, utilizing light illumination from light emitting diodes (LEDs) and a fast reflective spatial light modulator such as, liquid crystal on silicon (LCoS) or digital micromirror device (DMD). However, such multi-focal display architecture has low efficiency and dissipates a lot of heat. As, typically, an emission angle is large (typically 60 degrees to 120 degrees) for light emitted from LEDs, it is hard to gather and transmit light from LEDs efficiently. Also, only a limited cone reflected from the fast reflective spatial light modulator may be gathered by a projection lens. Furthermore, in order to ensure sufficient depth of field, an aperture of the projection lens has to be stepped down which worsens an overall light throughput of the multi-focal display architecture. Further, such microprojection units may become complex with large count of optical elements, which doesn't facilitate small footprint.

Another alternative is a laser-beam scanning projector, which may have compact footprint and superior efficiency. Nevertheless, the main disadvantage in relation to the multi-focal display architecture is in its image refresh rate. Micro electro-mechanical systems (MEMS) mirrors may oscillate on a fast-axis with approximately 100 kHz frequency. Thus, in order to ensure acceptable image refresh rate for the multi-focal display architecture, a scan frequency of a vertical axis has to be increased, which degrades effective image resolution. Otherwise, laser beam scanner technology may not be feasible for the multi-focal display architecture.

In the context of head mounted display device, the size of the image projector unit is of crucial importance. With smaller image projector unit, the whole head mounted display device may be made in a smaller footprint, may become lighter and thus may be more appealing to the user. In this regard, current image projector units are typically built around reflective spatial light modulator and light emitting diodes (LEDs) as the light source. Most typical spatial light modulators are digital micromirror devices (DMD) and liquid crystal on silicon (LCOS) modulators. Both of these technologies offer fast image refresh rates compatible to multi-focal display architecture. Nevertheless, utilization of LED light source isn't as efficient as on one hand the LED light sources provides high brightness but overall, such system is suboptimal from efficiency point of view, because the LED light sources have very wide emission angle such as, 60 degrees, 90 degrees, 120 degrees and larger. Thus, it is very challenging to gather and collimate such a large light cone, especially because the LED light source isn't a point-type source. In this process, a lot of light is lost. Thus, the LED light sources have to be driven at higher currents to ensure sufficient image brightness, which translates into excessive heating.

Furthermore, as pseudo-collimated light beam is directed towards the spatial light modulator, it is typically divergent with 15 degrees to 30 degrees for a cone angle. The projection lens typically isn't capable of gathering the whole cone and the light is lost even more. Furthermore, in order to ensure depth of field required for the multi-focal display architecture such image projector units have to introduce a closed-down aperture, which limits the diameter of the cone of the light, and inevitably excludes a part of light being transmitted through a lens system of projection optics. Thus, while current micro-projection units may be bright and sufficiently fast for multi-focal display architecture, these dissipate heat, and may be insufficiently bright to be usable in daylight type of scenario. Also, the known micro-projection units are typically large having a volume of 8 cubic centimetres to 10 cubic centimetres, which may not particularly be suitable for application in head mounted display device and the like.

Therefore, in light of the foregoing discussion, there exists a need to overcome the aforementioned drawbacks of known techniques of the multi-focal display architecture.

SUMMARY

The present disclosure seeks to provide an optical element for expanding and uniforming a beam of light. The present disclosure also relates to an apparatus, implementing such optical element, for expanding and uniforming a light beam and a method of manufacturing an optical element for expanding and uniforming a beam of light. An aim of the present disclosure is to provide a solution that overcomes at least partially the problems encountered in prior art, and provides the optical element for expanding and uniforming the beam of light.

According to a first aspect, an embodiment of the present disclosure provides an optical element for expanding and uniforming a beam of light comprising:
  plurality of layers of a first type and plurality of layers of a second type, wherein the plurality of layers of the first type and the second type are arranged as a stack of layers, in which the stack of layers every second layer is of the first type and every other second layer is of the second type,
wherein:
  the stack of layers comprises an input facet for receiving a beam of light and an output facet to output expanded and uniformed beam of light, wherein first side edges of the first and second type of layers are aligned with the input facet and second side edges of the first and second type of layers are aligned with the output facet, and
  the stack of layers forms a right triangular prism in which a surface of the input facet forms a first side of the right triangular prism and a surface of the output facet forms a second side of the right triangular prism and the first and second side are of a same width, and one of surfaces of the first type of layer forms a third side of the right triangular prism.

According to a second aspect, an embodiment of the present disclosure provides an apparatus for expanding and uniforming a light beam comprising:
  a first optical element arranged on an optical path of light to expand the beam of light in a first direction and
  a second optical element arranged on the optical path of the expanded beam of light to expand the expanded beam of light in a second direction to form expanded and uniformed beam of light, wherein the second direction is different from the first direction to expand the beam of light in two different dimensions.

According to a third aspect, an embodiment of the present disclosure provides a projector comprising:
  a light source to generate a beam of light;
  an apparatus arranged on optical path of the generated beam of light for expanding the beam of light; and
  a spatial light modulator arranged to receive the expanded beam of light and to modulate the expanded beam of light and
optics for providing the modulated light to a projection optics,
wherein, the apparatus for expanding the beam of light is according to the second aspect According to a fourth aspect, an embodiment of the present disclosure provides a method of manufacturing an optical element for expanding and uniforming a beam of light, the method comprising:
  arranging as a block stack a first type and second type layers one by one in which the block stack of layers every second layer is of the first type and every other second layer is of the second type;
  cutting, with a first cut and a second cuts, from the block stack a right triangular prism form factor stack in a way that a third edge of each layer form a first base of the right triangular prism and a fourth edge of each layer form a second base of the triangular prism and the first cutting surface forms an input facet and second cutting surface output facet of the optical element; and
  polishing the input and output facets.

Embodiments of the present disclosure substantially eliminate or at least partially address the aforementioned problems in the prior art, and provides the optical element for expanding and uniforming the beam of light efficiently.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION OF EMBODIMENTS

Figure 1:
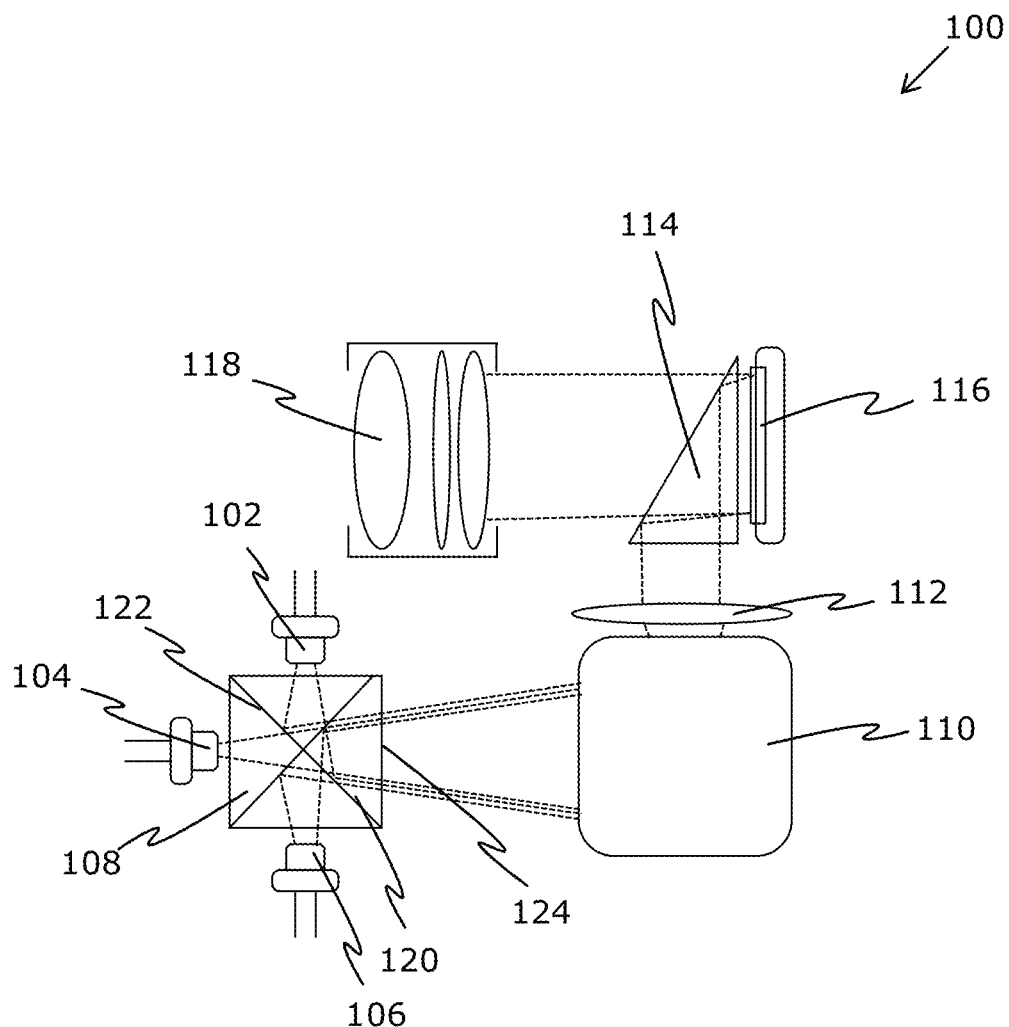
FIG. 1 is a schematic view illustration of a projector, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

According to a first aspect, an embodiment of the present disclosure provides an optical element for expanding and uniforming a beam of light comprising:
  plurality of layers of a first type and plurality of layers of a second type, wherein the plurality of layers of the first type and the second type are arranged as a stack of layers, in which the stack of layers every second layer is of the first type and every other second layer is of the second type,
wherein:
  the stack of layers comprises an input facet for receiving a beam of light and an output facet to output expanded and uniformed beam of light, wherein first side edges of the first and second type of layers are aligned with the input facet and second side edges of the first and second type of layers are aligned with the output facet, and
  the stack of layers forms a right triangular prism in which a surface of the input facet forms a first side of the right triangular prism and a surface of the output facet forms a second side of the right triangular prism and the first and second side are of a same width, and one of surfaces of the first type of layer forms a third side of the right triangular prism.

According to a second aspect, an embodiment of the present disclosure provides an apparatus for expanding and uniforming a light beam comprising:
  a first optical element arranged on an optical path of light to expand the beam of light in a first direction and
  a second optical element arranged on the optical path of the expanded beam of light to expand the expanded beam of light in a second direction to form expanded and uniformed beam of light, wherein the second direction is different from the first direction to expand the beam of light in two different dimensions.

According to a third aspect, an embodiment of the present disclosure provides a projector comprising:
  a light source to generate a beam of light;
  an apparatus arranged on optical path of the generated beam of light for expanding the beam of light; and
  a spatial light modulator arranged to receive the expanded beam of light and to modulate the expanded beam of light,
wherein, the apparatus for expanding the beam of light is according to the second aspect According to a fourth aspect, an embodiment of the present disclosure provides a method of manufacturing an optical element for expanding and uniforming a beam of light, the method comprising:
  arranging as a block stack a first type and second type layers one by one in which the block stack of layers every second layer is of the first type and every other second layer is of the second type;
  cutting, with a first cut and a second cuts, from the block stack a right triangular prism form factor stack in a way that a third edge of each layer form a first base of the right triangular prism and a fourth edge of each layer form a second base of the triangular prism and the first cutting surface forms an input facet and second cutting surface output facet of the optical element; and
  polishing the input and output facets.

Embodiments of the present disclosure substantially eliminate or at least partially address the aforementioned problems in the prior art, and provides the optical element for expanding and uniforming the beam of light efficiently.

The present disclosure relates to an optical element for expanding and uniforming a beam of light. The optical element of the present disclosure may be in the form of a lens, a mirror, a prism and the like on which the beam of light may be acted upon. Herein, the optical element is implemented as a uniforming element. In an embodiment, the optical element is a right triangle prism, which is configured to expand a beam of light in one direction and when two of such optical elements are combined in series, the light beam is first expanded in one direction (with a first optical element) and then the light beam which is expanded in the one direction is further expanded in another direction (with a second optical element) generally orthogonal to the said one direction, and thus the beam of light is expanded in two dimensions as a result. Thus, the optical element may be implemented in an image projection system for use with multi-focal display architectures.

For the purposes of the present disclosure, the beam of light may be obtained from light sources such as, light emitting diodes (LEDs) and lasers diodes. In an embodiment, the light source may include one or more of a red laser diode, a green laser diode and a blue laser diode. Typically, such laser diodes may be assembled in a small casing of 9 millimetres, or even 5.6 millimetres or smaller. The red laser diode may emit a red beam of light, the green laser diode may emit a green beam of light and the blue laser diode may emit a blue beam of light. The beam of light may be obtained by combining the red beam of light, the green beam of light, and the blue beam of light.

It must be noted that typically laser diodes emit elliptical beams with different beam divergence angles in orthogonal directions. Consequently, a collimator may be implemented as either at least two cylindrical lenses or, for example, as a single bionic lens or other lens combinations. Also, it must be noted that the collimator may be placed on the optical path before or after the optical element.

In an embodiment, a dichroic X-cube prism element may be used to combine all beams of light, such as, the red beam of light, the green beam of light, and the blue beam of light of various wavelength on a single optical path. Inner surfaces of the dichroic x-cube prism element may be coated with a band-pass filter or an edge reflection filter coating such as, a multi-layer dielectric coating. The band-pass or edge reflection filter coating of inner surfaces may be configured to reflect the beam of light from the laser diodes towards an output facet such that substantially all beam of light emitted from the red laser diode is reflected off of a first inner surface towards the output facet, and substantially all beam of light emitted from the blue laser diode is reflected off of a second inner surface towards the output facet, and substantially all beam of light emitted from the green laser diode is transmitted through the first and the second inner surfaces towards the output facet.

For this purpose, the first inner surface may be treated with the edge reflection filter, where a reflection edge is located at wavelength values lower than that of the red light beam emitted by the red laser diode. All wavelengths above the reflection edge are efficiently reflected considering optimized reflection angle of 45 degrees of incidence. Alternatively, the first inner surface is treated with the band-pass filter coating with an efficient reflection band, that covers wavelength values of the red light beam emitted by the red laser diode. In contrast the second inner surface is treated with the edge type reflection filter (also possibly the band-pass filter) with the efficient reflection band covering a range that contains wavelength of the blue light beam emitted by the blue laser diode. That is, the reflection edge of the second inner surface may be above the wavelength of the blue laser beam. As the wavelength of the green light beam emitted by the green laser diode is between the wavelengths of the red light beam and blue light beam, coatings of the first and second inner surfaces may facilitate unrestricted transmission of the green light beam towards the output facet. That is, the reflection edge of the first inner surface may be between the wavelengths of the red light beam and the green light beam, whereas the reflection edge of the second inner surface may be between the wavelengths of the blue light beam and the green light beam.

In an alternative embodiment, instead of using the dichroic x-cube prism element, the beam of light emitted from laser diodes may be combined on the optical axis by other means. For example, a linear arrangement of dichroic mirrors may be used. However, the linear arrangement of dichroic mirrors may have a disadvantage of slightly increasing an overall footprint of an illumination stage. Another alternative is to use planar optical waveguide combiner to combine red light beam, green light beam and blue light beam emitted from red laser diode, green laser diode, blue laser diode respectively. This approach yields reduced footprint as there is no need for relatively bulky prisms and beam-splitters. Furthermore, an efficiency of beam combination by planar waveguides has been reported up to 97 percent. Such configurations may be contemplated by a person skilled in the art and thus not described further for the brevity of the present disclosure.

The optical element comprises a plurality of layers of a first type and plurality of layers of a second type, wherein the plurality of layers of the first type and the second type are arranged as a stack of layers, in which the stack of layers every second layer is of the first type and every other second layer is of the second type. In other words, the plurality of layers of the first type and the plurality of layers of the second type may be arranged in such a way that each layer of first type is succeeded by the layer of second type. That is, the layer of first type and the layer of second type are alternatively arranged in the optical element. Herein, the first type of layers and the second type of layers may generally have same dimensions (length and width) or different dimensions necessary to impart the required shape to the optical element (as discussed later in some more detail) without any limitations.

The stack of layers comprises an input facet for receiving a beam of light and an output facet to output expanded and uniformed beam of light, wherein first side edges of the first and second type of layers are aligned with the input facet and second side edge of the first and second type of layers are aligned with the output facet. Herein, the input facet may be a surface of the optical element on which the beam of light may incident and the output facet may be a surface of the optical element through which an expanded and uniformed beam of light may exit from the optical element.

The stack of layers forms a right triangular prism in which a surface of the input facet forms a first side of the right triangular prism and a surface of the output facet forms a second side of the right triangular prism and the first and second side are of a same width, and one of surfaces of the first type of layer forms a third side of the right triangular prism. As discussed, the optical element may be right triangular prism. Herein, the surface of the input facet on which the beam of light may incident forms the first side of the optical element; and the surface of the output facet through which the expanded and uniformed beam of light may exit forms the second side of the optical element. In order to form the right triangular prism (as described), the width of the first side and the second side is same. Herein, the right triangular prism shape for the optical element may enable expanding and uniforming the beam of light efficiently thereby.

Optionally, the first type of layers and the second type of layers are transparent and planar. For example, the first type of layers may be made of transparent glass and the second type of layers may be adhesive polymers that are transparent. Herein, the second type of layers may act as the adhesive to allow for binding and stacking of the first type of layers in the optical element. With the second type of layers being transparent, this may ensure that maximum amount of the beam light-intensity is transmitted through the optical element. Such transparent adhesives which may be implemented as the second type of layers (as described) are well known in the field of optics and thus not described herein.

Optionally, the first type of layers are glass and the second type of layers are adhesive polymer. Herein, a thin glass sheet may be cut into a plurality of small pieces. Each small piece may form the first type of layer. Further, the plurality of smaller pieces may be bonded together by adhesives polymer. Herein, the adhesives polymer may be an optical cement and may form the second type of layers.

Optionally, the first type of layer is a substrate treated on at least one side with a functional coating and the second type of layer is optically transparent adhesive or bonding agent. Herein, a thin glass sheet may be the substrate of the first type of layer. The thin glass sheet (substrate) may be coated with the functional coating on at least one side to form the first type of layer. The functional coating may be such that when the beam of the light is incident on the functional coating, the beam of light is partially reflected and partially transmitted through this interface. The functional coating may be optimized to perform at given conditions when it is disposed within a bulk of the substrate.

Optionally, the functional coating is at least one of: a patterned mirror structure arranged to have openings to allow at least part of received light to pass light from one layer of the first type to another layer of the first type and mirrored surface areas to reflect light, a multi-layer stack of dielectric, and/or a mix of dielectric and metallic thin films, forming a functional coating of a beam splitter optimized for operation within the bulk of a substrate material. Herein, the patterned mirror structure may be a full mirror or random full-mirror patches such that when the beam of light is incident on the patterned mirror, the beam of light is either fully reflected, fully transmitted or partially reflected and partially transmitted. The multi-layer dielectric film stack may be formed by coating a thin glass sheet with dielectric materials such as, oxides ($SiO_x$, $SiO_2$, $TiO_2$, $Ta_2O_5$, $Al_2O_3 Nb_2O_5$ and alike), nitrides, fluorides, borides and other refractive materials, porcelain (ceramic), mica, glass, plastics, to form a stack of alternating layers of high and low index of refraction or alternatively alternating between layers of 3, 4, 5 etc. gradations of index of refraction. In some embodiments, the functional coating may be a hybrid coating containing a mix of the dielectric and metallic thin films in order to form the beam splitter. It will be appreciated that the beam splitter may divide the beam of light into one or more light beams for expanding and uniforming the beam of light.

Optionally, the functional beam-splitter coating is substantially non-polarizing. Herein, the thin glass sheet may be coated with polarization insensitive beam-splitter coating. Thus, the functional beam-splitter coating may split the beam of light into one or more light beams irrespective of a polarization of the beam of light incident on the functional beam-splitter coating. Hence, all of the beam of light may be expanded and uniformed and no information may be lost.

Optionally, the stack of layers further comprises an expansion layers, wherein the expansion layers comprise the first and second type of layers arranged as an expansion stack in a top of the third side of the triangular prism to form the stack of layers as a trapezoidal prism. The addition of the expansion layers, in the optical element, comprising the first and second type of layers arranged as the expansion stack in the top of the third side of the triangular, may help in expanding the beam of light to a greater extent by the optical element.

Optionally, the first type of layers are dimensioned to be 80 to 140 times thicker than the second type of layers. As an example the first type layers can be 200 micrometres and the second type of layers 2 microns (to have 100 times thicker first type of layers than the second type of layers). That is, the first type of layers may be thicker compared to the second type of layers in the optical element. Herein, in order to manufacture the optical element, a glass substrate may be treated with a multi-layer stack of dielectric coating. A thickness of the multi-layer stack of dielectric coating may be very thin as compared to the thickness of the glass substrate, so that the multi-layer stack of dielectric coating would modify the first type of layer but still it may be considered as the first type of layer comprised of substrate and functional coating with given properties; and the second type of layers may be adhesive polymer thinner than the first type of layers. According to an example the first type of layers can be dimensioned to be 80, 90, 100, 110, 120, 130 to 90, 100, 110, 120, 130, 140 times thicker than the second type of layers.

Optionally, the first type of layers have a first refractive index and the second type of layers have a second refractive index different from the first refractive index. That is, in the present examples, the first type of layers and the second type of layers may have different refractive indices. It will be appreciated that the refractive index is a parameter for determining how fast a ray of light travels through a medium and affects an angle through which the ray of light exists the medium. Optionally, the first refractive index is between 1.6 to 1.9 and the second refractive index is between 1.3 to 1.55. That is, the first refractive index may be from 1.6, 1.65, 1.7, 1.75, 1.8, and 1.85 up to 1.65, 1.7, 1.75, 1.8, 1.85, and 1.9 and the second refractive index may be from 1.3, 1.35, 1.4, 1.45, and 1.5 up to 1.35, 1.4, 1.45, 1.5, and 1.55.

Alternation between the first type of layers having relatively a high index of refraction and the second type of layers having a relatively low index of refraction forms interfaces with abrupt change in indices of refraction. Term relative high or low can be understood to cover for example a scenario on, which the first type of layers have index of refraction as 1.75 or higher and the second type of layer have an index of refraction of 1.4 or below. Such interfaces are characterized by property of substantially reflecting light. In other words, such interfaces act as beam-splitters. Furthermore, depending on the difference in the index of refraction between the first type of layer and the second type of layer, the strength of a beam-splitter can be adjusted. That is a proportion of reflected and transmitted light in target directions can be varied to achieve optimum level of light expansion and uniformization.

Optionally, the refractive indices of the substrate of the first type layer and the second type layer are substantially similar. That is, in some alternate examples, namely when the first type of layer is formed as a substrate treated on at least one side with a functional coating (i.e. a functional layer), the second type of layers (i.e., glue) may have refractive index similar or substantially similar to that of the substrate of the first type of layer without any limitations. In a preferred embodiment, the refractive index of an optical compound, such as the thin adhesive polymer used to bond the glass sheets may be substantially similar to that of the substrate itself. Alternatively, it may be possible to account for a certain glue type when modelling the beam-splitter layer stack to achieve the same refraction therefrom despite having different refractive indices. As discussed, the functional coating may be optimized to perform at given conditions when it is disposed within the bulk of the substrate. For anti-reflective or functional beam-splitter coating in air, the functional coating may not be the same as for functional coatings with same functionality embedded between two thin glass sheets. In case, the functional coating is embedded between two thin glass sheets that are glued together by adhesive polymer, the adhesive polymer may have the same refractive index as the substrate (which is in this example a glass sheet).

In an embodiment, the optical element comprises multiple beam splitters and a single full mirror. Herein, a final substrate which is farthest from the beam of light that is incident on the optical element may be functionally coated with the full mirror. In alternative embodiment the functional coating on final substrate may be the same as on all other substrates. In yet another embodiment the final layer may be a bare substrate. Typically, a whole assembly of the optical element may have a relatively high index of refraction in comparison to typical ambient surrounding (air) in which the optical element is intended to be operated, and the beam of light may be incident upon a surface of the optical element at 45 degrees angle. Hence due to total internal reflection (TIR), the beam of light may not escape the optical element but may be fully reflected outwards in a desired direction. In case, the index of refraction for the substrates is lower than approximately 1.42, a total internal reflection condition may be broken, and the functional coating on the final substrate has to be a full mirror so as to not to spill the beam of light in unwanted direction and thereby reduce overall efficiency of the optical element. Furthermore, preferably dielectric or hybrid coating may be optimized for 45 degrees incidence angle in a glass medium. The present example, not only expands and uniforms the beam of light, but also substantially reduces speckle patterns, which otherwise are mitigated by means of active vibrating mirrors or rotating diffusers that may reduce an overall efficiency of a light engine and add to a bulk and complexity of a projector.

Typically, for a good result, it is preferable for the optical element to include as many beam-splitters as possible. A typical preferable thickness of the substrate (of the first type of layer) to be used as the beam splitter may be in the range of 0.2 millimetres to 0.55 millimetres. Though thinner substrates are also possible; however, processing of thinner substrates may be too challenging. Nevertheless, a size of a spatial light modulator may also be taken into account. For best intensity smoothing performance it is desirable to have multiple beam splitters, nevertheless, in case of small stacks due to size limitations of the said spatial light modulator, it might not be possible. Thus, some situations allow for either thinner or thicker substrates. Furthermore, a ratio of reflection to transmission for the beam splitter interface may be preferably around 20:80 (i.e., 20 percent reflection, 80 percent transmission) for a typical case. However, a range of the ratio of reflection to transmission for the beam splitter may be from 10:90 to 40:60, including like 30:70, 40:60, 50:50 and so on. It may be understood that with the stack having more beam-splitter layers, beam splitters have to be more transparent; while with less layers (small stacks) to achieve uniformity, the beam splitters have to be more reflective.

Furthermore, generally when an optical element is formed properties (i.e. index of refraction) of all the second type of layers are substantially identical forming internal interfaces with identical beam-splitting strength. Nevertheless, there might be situations given a size and count of layers as well as size and position of the incident light beam, that the expanded output beam has non-uniform intensity distribution. That is, for example, a larger intensity is observed at one side of the expanded light beam. Such situations typically arise due to limited degrees of freedom from optical design point of view (such as size of optical elements, number of layers etc). It has been found, surprisingly, that this effect can be countered by including within the optical element at least one third type of layer with lower index of refraction than the second type of layers have. Indeed in an alternative embodiment a stack of layers further, comprise at least one third type of layer with 5-20% lower index of refraction than index of refraction of the second type of layers. The index of refraction can be for example 5%, 10% or 20% lower than the second type of layers have. Preferable relative position of such other third type of layer is to have it in the stack between layers from layers in half way of the stack to about 70% of layers as seen from the edge of the input facet. As an example if there are 10 layers then this at least third second type should be at least one of $5^{th}$, $6^{th}$, or $7^{th}$ layer as seen from edge of the input facet. In another example there are 100 layers then at least third type of layer should be arranged to be between layer number 50 to 70. Alternatively the layer can be between layers 55-65. This way an interface will be formed by the third type of layer and the first type of layer will have different optical properties (in comparison to interface between second and first type of layer), namely increased reflection due to a larger difference in indices of refraction between the third type of layer and the first type of layer. In this alternative embodiment the third type of layer has preferably substantially same thickness than in average second type of layers would have. That will introduce an additional degree of freedom and thus enabling more uniform distribution of intensity within the output light beam.

In an alternative embodiment, the optical element may be implemented by coating the substrates with random full-mirror patches. A diameter of the random full-mirror patches may depend on an overall diameter of the beam of light and may generally be smaller. Preferably the diameter of the random full mirror patches may be in the order $1/20^{th}$ to $1/100^{th}$ (including like $1/40^{th}$, $1/60^{th}$ and $1/80^{th}$ and so forth) of the diameter of the beam of light. That is, if the beam of light of diameter 5 millimetres is incident upon the optical element, the diameter of the random full-mirror patches may be in the range of 50 µm to 250 µm. In effect, the random full-mirror patches are in the form of a "polka-dot" type beam splitter with a fill factor of 10 percent to 20 percent to emulate the 10/90 to 20/80 range of the ratio of reflection to transmission. Furthermore, the random full-mirror patches may not necessarily have to be circular in nature. Random patches, square patches and patches of various size are all possible.

To obtain such beam splitter two main techniques may be employed. In an embodiment, the substrate may be coated with full mirror and subsequent etching such as, direct etching (for example, using laser ablation or ion-beam etching) may be performed. Photoresist process may be also performed using exposure masks or direct UV exposure. In an alternative embodiment, deposition may occur already through a mask and a pseudorandom pattern of full mirror patches may be deposited directly onto the substrate. In some examples, the mirror patches may not be full mirror but a partial mirror, for example with 40 percent to 80 percent reflection in a visible spectrum.

A normal vector of the input facet for the optical element has to be substantially collinear with a direction of the beam of light. In order to meet aforesaid conditions, coated substrates are bonded by adhesive polymer in order to ensure continuity of the optical element by matching the refractive index for the coated substrate with that of the adhesive polymer to best extent possible. Then from the bonded coated substrates, a multi-layer stack of beam splitter according to required shape is cut out and essential surfaces, such as the input facet and the output facet are polished to reduce unwanted scattering. Optionally, the input facet and the output facet are coated with an anti-reflection coating, to minimize light loss due to reflection on these external surfaces.

It may be noted that if the input facet is substantially perpendicular to the beam of light (though due to slight divergence some minute deviations are possible), effects of refraction for the beam of light propagating within the optical element may be minimized. The beam of light may be transmitted through the whole optical element and in each instance of encountering the beam splitter interface, a fraction of intensity of the beam of light may be reflected in a substantially orthogonal direction. Above process may be repeated multiple times, which may give rise to superior uniformization properties of such optical elements. It must be noted, that due to nature of multiple beam-division instances, the beam splitter utilized within the optical element may have to have ultra-low absorption properties. That is, a design has to foresee utilization of materials and material combination, which yield absorption values that are virtually zero over visible spectrum.

Thus, by implementing the optical element by the technique described herein, the projector may be reduced in footprint, while maintaining high brightness and efficiency. Utilization of laser diodes is beneficial, as the emission angle is constrained in contrast to conventional light emitting diodes (LEDs) emitting in very wide angle. That is, light emitted from laser diodes may be collimated more efficiently facilitating reduction of light loss. Furthermore, as achieved collimation corresponds to a higher degree, a resultant divergence angle is low and may reach in an order of one to two degrees. Due to this, projection lens may efficiently gather reflected and modulated light beams that may further facilitate in improving efficiency and depth of field, and in case of multi-focal display architecture sharp images may be formed on all physical image planes without a need for active re-focusing system.

The present disclosure also provides an apparatus for expanding and uniforming a light beam comprising: a first optical element arranged on an optical path of light to expand the beam of light in a first direction and a second optical element arranged on the optical path of the expanded beam of light to expand the expanded beam of light in a second direction to form expanded and uniformed beam of light, wherein the second direction is different from the first direction to expand the beam of light in two different dimensions. Optionally, the first optical element and the second optical element are similar to the optical element described in the preceding paragraphs. Herein, beam of light may be incident on an input facet of the first optical element and the first optical element may expand the beam of light in the first direction. The expanded beam of light may then be incident on an input facet of the second optical element so that the second optical element expands the expanded beam of light in the second direction. In this way, a two-dimensional expansion of the beam of light is obtained.

Optionally, an input facet of the first optical element is arranged to be orthogonal in respect to input facet and output facet of the second optical element, and an output facet of the first optical element faces the input facet of the second optical element and surfaces of the output facet of the first optical element and the input facet of the second optical elements are parallel. Herein, the input facet of the first optical element may be orthogonal to the input facet and output facet of the second optical element. That is, if the input facet of the first optical element is along 'x' axis, the input facet and output facet of the second optical element, may be along a 'y' axis and a 'z' axis. The output facet of the first optical element faces the input facet of the second optical element so that the expanded beam of light from the first optical element is incident on the input facet of the second optical element.

Optionally, the apparatus further comprises a third optical element arranged to be orthogonal in respect to input facet and output facet of the second optical element and surfaces of output facet of the second optical element is parallel with an input facet of the third optical element. Herein, the third optical element may provide additional uniformization, and/or additional expansion of the expanded and uniformed beam of light from the second optical element in either the first or second direction so that the beam of light is expanded further and/or uniformized to a greater extent. In order to do so, the output facet of the second optical element and surfaces of the output facet of the second optical element are parallel with an input facet of the third optical element, such that the expanded and uniformed beam of light from the second optical element is incident on the input facet of the third optical element.

The present disclosure also relates to a projector comprising: a light source to generate a beam of light; an apparatus arranged on optical path of the generated beam of light for expanding the beam of light; a spatial light modulator arranged to receive the expanded beam of light and to modulate the expanded beam of light and optics for providing the modulated light to a projection optics.

Herein, the light source may be laser diodes such as, red laser diode, green laser diode and blue laser diode. As discussed, semiconductor laser diodes typically have considerable divergence angle along one axis that is, a fast axis. For example, the divergence angle may be 22 degrees and more. The divergence angle on the orthogonal axis, that is slow axis, is much lower, for example 4 degrees to 10 degrees (with some 6 degrees to 7 degrees being very common). Thus, resultant beam of light is elliptical. For this reason, corresponding first optical collimators in form of cylindrical lenses are used for the red laser diode, the green laser diode and the blue laser diode. These first optical collimators limit corresponding laser beam divergence on the fast axis. Depending on a characteristic and placement of a particular laser diode such as, the red laser diode, the green laser diode and the blue laser diode, first optical collimators may be similar having similar optical strength for all colours.

Alternatively, individual first optical collimators may be provided each of the red laser diode, the green laser diode and the blue laser diode. To combine emitted laser beams on the optical path, two dichroic mirrors or beam splitters may be employed. A first dichroic mirror may be a long pass filter with an edge between wavelengths of the green laser diode and the red laser diode. That is, the first dichroic mirror may transmit longer wavelengths emitted from the red laser diode and may reflect shorter wavelengths emitted from the green laser diode at 45 degrees angle. A second dichroic mirror may have similar characteristics and the edge may be shifted towards shorter wavelengths and may be between the wavelengths emitted from the green laser diode and the wavelengths emitted from the blue laser diode. That is, wavelengths emitted from the green laser diode and the red laser diode is transmitted with very high efficiency, while the wavelengths emitted from the blue laser diode is reflected at 45 degrees angle with very high efficiency. Thus, after the second dichroic mirror, all light beams are aligned on the optical axis.

After this, a second collimator may be placed. In an embodiment, the second collimator may be a cylindrical lens which collimates the beam of light on the slow axis. After the beam of light is fully collimated, it may be directed towards the first optical element of the apparatus, which performs beam uniformization in the first direction (in this example, corresponding to the shortest side of a spatial light modulator). Next the expanded beam of light enters into the second optical element of the apparatus where it is shaped and uniformized along the second direction.

In the present examples, the first direction may correspond to a shortest side of the spatial light modulator and the second direction may correspond to the longest side of the spatial light modulator. It may be noted that the first optical element and the second optical element may work in conjunction. A shape including physical size or geometry and number of the first type of layers and the second type of layers is determined by the geometry of the spatial light modulator, in which the expanded and uniformed beam of light may enter through a total internal reflection prism. After reflecting from the spatial light modulator, the expanded and uniformed beam of light may face total internal reflection from angled surface of the optics, such as, the total internal reflection prism and exits towards the projection optics.

In the present embodiments, the projection optics (also, sometimes, simply referred to as "optics") is the projection lens comprised of lens elements. As the spatial light modulator is illuminated by collimated beam of light, the projection lens gathers the expanded and uniformed beam of light with high efficiency and ensures substantially improved depth-of-field in comparison to prior art projection units.

From the point of view of size, the projector of the present disclosure offers reduction in footprint by more than three times in comparison to analogous prior art projection units.

Optionally, the optics for providing the modulated light to the projection optics comprises an anamorphic lens. It will be appreciated that the anamorphic lens may be capable of capturing a wide-angle field of view. The anamorphic lens helps in providing a cinematic view to a user by changing dimensions of the image in one axis. In particular, compared to spherical lens which project a circular image onto the screen surface, anamorphic lenses project an oval-shaped image due to optical elements that, for example, can expand more vertical information, and thus may help to widen the aspect ratio (by stretching the vertical dimension) of a projected image in comparison to the aspect ratio of a spatial light modulator. That is, by utilizing an anamorphic projection lens, a taller projected image than otherwise provided by spatial light modulator can be obtained.

It may be noted that depending on the technology of spatial light modulator (LCOS, DMD), the coupling optics may be a polarization-sensitive beam splitter, triangle-prisms, compound total internal reflection prism and the like. Alternatively, in some situations (like when using a transmissive spatial light modulator, an LCD micro panel) the optics may be omitted, nevertheless, such scenarios typically are associated with increased footprint of the projector. Also, it may be noted, that additional components such as quarter waveplates, polarization filters, polarization rotators might be implemented depending on standard procedures of light coupling and outcoupling from a given type of spatial light modulator.

As the optical diffuser elements have physical depth, and active regions of the optical diffuser elements are at different distances from the projection optics and the optics, the projection optics may have to project the image with sufficient depth of field to ensure a sharp image on all active layers of the optical diffuser elements. In an example, a minimum depth of field over which the projection optics has to ensure substantially equal image sharpness is from d2 to d1, where d1 is distance of a first optical diffuser element from the projection optics and d2 is distance of a second optical diffuser element from the projection optics. Nevertheless, as depth of field has no hard boundaries, its extent is determined by a range in which an image spot size preferably varies, that is, becomes larger by 40 percent to 50 percent from a smallest achievable spot size in the middle of the stack of optical diffuser elements. Alternatively, acceptable image spot size variation within the depth of field across a solid-state liquid crystal diffuser element stack varies in the range of 50 percent to 90 percent. Furthermore, it is preferable that the image spot size is less or comparable to that of an image pixel at a given distance, which in turn is determined by a pixel size and density of the spatial light modulator and size of the optical diffuser element onto which the image is expanded. For example, if the size of a usable region of the optical diffuser element on which the image is expanded is 25 millimetres by 14 millimetres and an effective resolution of the spatial light modulator therein corresponds to 1920 pixels by 1080 pixel, then 1920 pixels would correspond to 25 millimetres. Correspondingly, when 25 is divided 1920, 0.013 millimetres or 13 micrometres is obtained. Therefore, it is preferable that in such case all point diameters within the depth of field of the projector illuminating the optical diffuser elements do not surpass this threshold value of 13 micrometres. For example, if uniform sharpness across the whole image and variance of spot-size across depth of field of 90 percent is considered, then sharpest point size "x" can be calculated from the equation:

$$x + 0.9x = 13 \text{ micrometers},$$

from which x is calculated as 6.84 micrometres. That is, the image point size the projector has to yield is 6.84 micrometres in diameter at the target distance. In the context of multi-focal head-mounted display devices, the size of a projector is of crucial importance.

When the projector of the present disclosure is utilized as the image source in the multi-focal head-mounted display architecture such as, an optically see-through augmented reality glasses/headset, it offers multiple benefits. First, reduced size of the projector, helps in reducing overall footprint of the multi-focal display architecture. Second, as image brightness is increased due to more efficient nature of illumination and image forming, the projector can be day-light compatible, without blocking out the intensity of the light from ambient surroundings. Third, due to increased depth-of-field, images on all focal planes are of substantially equal sharpness from perspective of the user or a viewer, which is achieved by not sacrificing image brightness due to decreasing aperture, which is a typical method used in prior-art devices. Additionally, by utilizing tri-colour laser diode sources the projector provides a wide colour gamut, which increases contrast as compared to LED based illumination typically found in prior-art devices.

Thereby, the projector of the present disclosure serves as a miniature image source capable of projecting a series of 2D images at a rapid pace with high image refresh rate such as, 120 Hz, 240 Hz, 360 Hz or similar. The projector projects images towards a multi-focal demultiplexer such as, a stack of liquid crystal diffuser elements. The projector and multi-focal demultiplexer may be communicably coupled to a processing unit and are operated in synchronicity. Each liquid crystal diffuser element of the multi-focal demultiplexer corresponds to a discrete focal plane, which may be addressed individually to change between two optical states. A first optical state is highly light transparent and a second optical state is light diffusing. At a given moment of time only one of the liquid crystal diffuser elements is configured in the second optical states, while others are kept in the first optical state. Thus, when the beam of light from the projector reaches the liquid crystal diffuser elements in the second optical state, it becomes scattered or diffused at a wider angle. In an example, between the projector and the multi-focal demultiplexer, a folding mirror may be positioned. The folding mirror can help in folding the optical path to make design more convenient and ergonomic from a wearing standpoint. Furthermore, more than one folding mirror is possible in the design. After the multi-focal demultiplexer, the beam of light is directed towards an eyepiece and a viewer's eye.

The augmented reality glasses are formed using a bird-bath image combiner, where the beam of light is directed towards a first beam splitter, which is a flat beam splitter and typically splits the beam of light in a 50:50 ratio though other alternative ratios are possible; then, a reflected portion of the split beam of light is directed towards a second beam splitter, which is a curved optical component having optical strength in respect to reflected light. In essence the second beam splitter is the eyepiece, which magnifies the image formed on the multi-focal demultiplexer. The second beam-splitter also typically has 50:50 ratio; i.e., 50 percent of the intensity is reflected while 50 percent of the intensity is transmitted. Though, other ratios are also possible for the second beam splitter. Often, the ratio may be such that more than 50 percent of intensity is transmitted. For example, the ratio may be 30:70, where 30 percent of the intensity is reflected and 70 percent is transmitted. Thus, with the present configuration more light in terms of intensity from the ambient surroundings may reach the viewer producing a perceptually brighter image of ambient world. As the beam of light is reflected from the second beam splitter, it transitions through the first beam splitter, is directed towards the eyes of a viewer. In this act of passing through the first beam-splitter, further a fraction of light-intensity is lost.

It may be appreciated that the given example provides an optical pipeline for a single eye only. Nevertheless, preferred embodiment of this, is found as a stereoscopic display, for which the same principles may generally apply. In this architecture, the multi-focal demultiplexer may provide physically separated focal planes, which may then project image through an eyepiece to form virtual image planes at different distances. Thus, the viewer has an ability to accommodate within a 3D scene, including monocularly.

The present disclosure also provides a method of manufacturing an optical element for expanding and uniforming a beam of light. Various embodiments and variants disclosed above apply mutatis mutandis to the system.

The method comprises arranging as a block stack a first type and second type layers one by one in which the block stack of layers every second layer is of the first type and every other second layer is of the second type. Herein, the first type of layers and the second type of layers may be arranged in alterations. The method comprises cutting, with a first cut and a second cuts, from the block stack a right triangular prism form factor stack in a way that a third edge of each layer form a first base of the right triangular prism and a fourth edge of each layer form a second base of the triangular prism and the first cutting surface forms an input facet and second cutting surface output facet of the optical element. The block stack of layers may be cut to obtain the right triangular prism. The method comprises polishing the input and output facets. Herein, the input and output facets may be polished so as to lose minimum light energy due to surface roughness typically present after cutting.

Optionally, method further comprising coating the input and output facets with an anti-reflective coating. Herein, the anti-reflective coating may prevent reflection of light from the input and output facets.

The optical element of the present disclosure enables efficient expansion and uniforming the beam of light. Thus, brightness, efficiency and dept of field of the image formed using the optical element is enhanced. Moreover, the optical element is compact and thus, addresses issues of footprint making it apt for multi-focal near-eye display architecture. Further, the apparatus of the present disclosure, implementing the optical element, may be employed in a number of applications. In an embodiment, the apparatus may be used together with waveguides such as, holographic, diffractive or refractive waveguide. Typically, holographic or diffractive image waveguides are chosen for construction of augmented reality glasses to ensure small glasses-like footprint, as they offer flat look and substantial eye-box. Previously, in such scenarios LCOS and LED based projectors were used as image sources, or alternatively include scanning laser beam projectors. Such configurations typically have large footprint, inadequate image quality and reduced efficiency with which the image is transmitted via an image waveguide. The projector of the present disclosure reduces footprint substantially by more than three times in comparison to analogous LED based counterpart while improving efficiency. Furthermore, due to specific narrow wavelengths of laser diodes, in-coupling and out-coupling efficiency in case of holographic/diffractive image waveguides may be increased. In contrast, more collimated nature of such image source is also beneficial in combination with refractive-type image waveguides.

In an embodiment, the apparatus may be used together with holographic mirror. Another application of described projector is an augmented reality near-to-eye display system which utilizes holographic mirror as an optical image combiner. That is, an optical function is recorded within a volume hologram or alternatively in tailored meta-surface, which shapes an incident beam of selected wavelength in a desired way. A benefit of holographic mirrors/meta-surfaces is in possibility to reflect and project off-axis thus enabling more compact arrangement of projection components with respect to a frame or a housing of the near-to-eye display. It must be noted that similarly a holographic mirror or a holographic film may be used in head-up displays, for example, in aviation or automotive sector.

In an embodiment, the projector of the present disclosure may be employed within a multi-focal display architecture. The multi-focal display architecture relies on a solid-state liquid crystal diffuser element stack comprised of at least two optical diffuser elements as spatially separated image planes, which are time-sequentially activated to transition from the first optical state to the second optical state. The first optical state may be highly light transparent over utilized visible spectrum (generally 400-700 nm in wavelength), while the second optical state may be highly light scattering. Furthermore, the transition between both optical states may be controlled electrically by applying or removing control voltage on the electrodes of solid-state liquid crystal diffuser element stack. Herein, essentially, the optical diffuser element in the second optical state becomes an image receiving screen, while in the first optical state it virtually doesn't interact with the incident light. The image source optically coupled to the optical diffuser stack is a micro-projection unit, which projects image depth planes onto corresponding optical diffuser element when it is in the second optical state.

DETAILED DESCRIPTION OF THE DRAWINGS

FIG. 1 is a schematic view illustration of a projector 100, in accordance with an embodiment of the present disclosure. The projector 100 comprises a red laser diode 102 for emitting a red light beam, a green laser diode 104 for emitting a green light beam, a blue laser diode 106 for emitting a blue light beam, a dichroic x-cube prism 108, an optical element 110, a collimator 112, a total internal reflection prism 114, a spatial light modulator 116 and a projection optics 118. An inner surface 120, and an inner surface 122 of the dichroic x-cube prism 108 are coated with band-pass filter coating in order to reflect the red light beam, the blue light beam and the green light beam towards an output surface 124. A beam of light exits from the output surface 124. The optical element 110 expands and uniforms the beam of light. The collimator 112 collimates expanded and uniformed beam of light and directs it towards the total internal reflection prism 114, and the spatial light modulator 116 which modulates an amplitude of the expanded and uniformed beam of light and through the total internal reflection prism 114 directs already modulated beam of light towards the projection optics 118.

Figure 2:
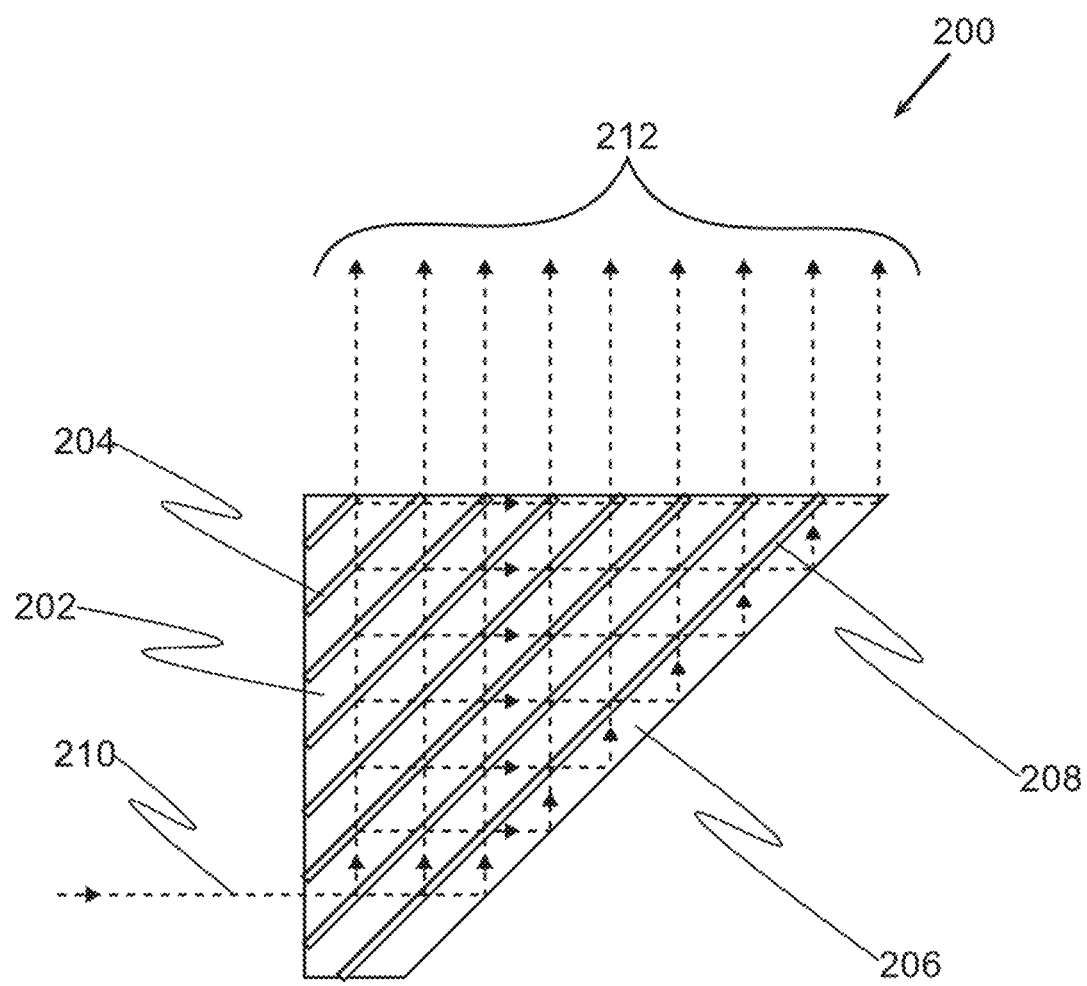
FIG. 2 is a schematic view illustration of an optical element, in accordance with an embodiment of the present disclosure.

FIG. 2 is a schematic view illustration of an optical element 200, in accordance with an embodiment of the present disclosure. The optical element 200 includes a first type of layers 202, and a second type of layers 204. Herein, the first type of layers 202 are glass-based layers and the second type of layers 204 is an adhesive optical polymer by means of which the first type of layers are bonded together. Further, a first type of layer 206 farthest from a beam of light 210 that is input to the optical element 200 is optionally coated with a full mirror 208. In the preferred embodiment this is not mandatory, as the angle of incidence meets the criterion of total internal reflection occurring absolutely efficiently. When the beam of light 210 of given dimensions is directed upon the optical element 200, the beam of light 210 is expanded and an expanded and uniformed beam of light 212 is generated.

Figure 3:
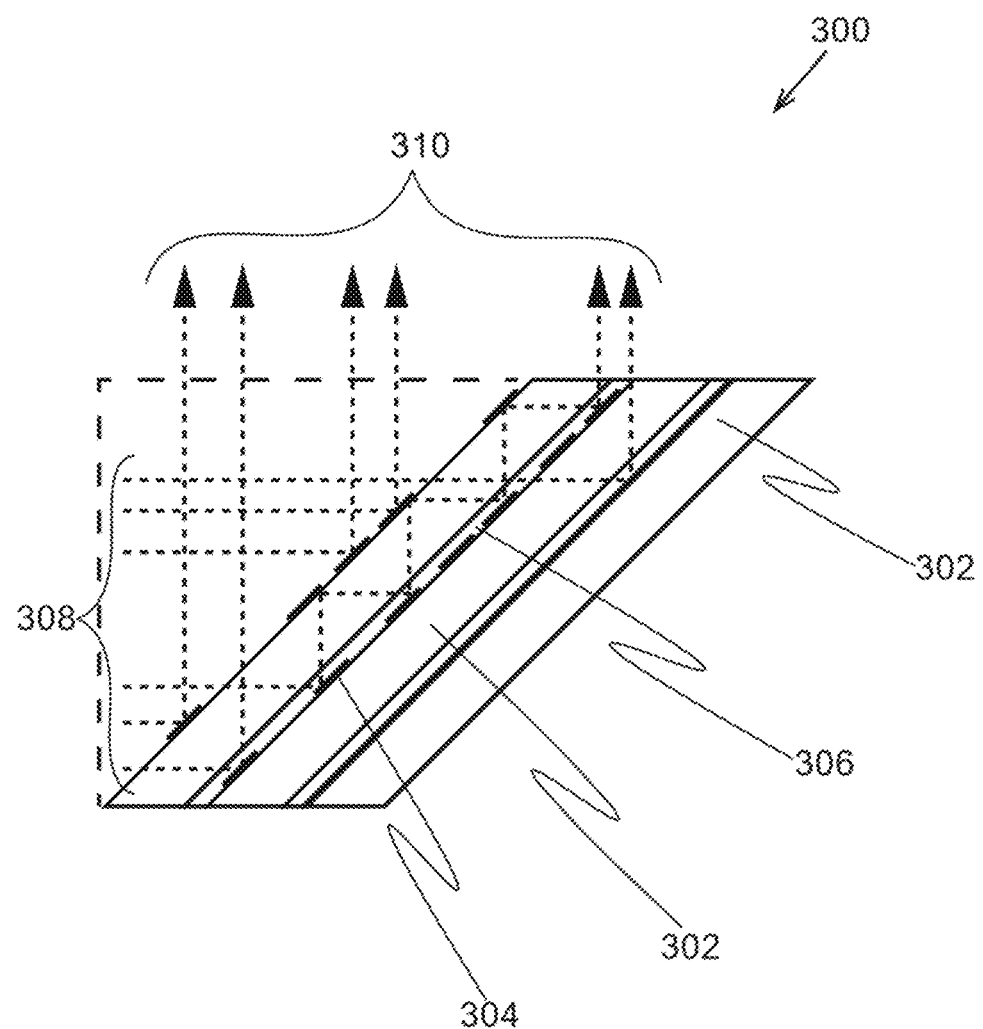
FIG. 3 is a schematic view illustration of an optical element, in accordance with another embodiment of the present disclosure.

FIG. 3 is a schematic view illustration of an optical element 300, in accordance with another embodiment of the present disclosure. The optical element 300 includes a first type of layers 302 comprised of a substrate and a functional coating 304, and a second type of layers 306. The functional coating 304 is typically a layer of material coated in top of the first type of layer. The functional coating 304 on the substrate of the first type of layers 302, is in the form of random full-mirror patches. The second type of layers 306 are optical bonding agent—an adhesive, optical cement, resin and alike deposited to bond together the first type of layers forming the optical element 300. When a beam of light 308 of given dimensions is directed upon the optical element, the beam of light 308 is expanded and uniformed, and the expanded and uniformed beam of light 310 is generated.

Figure 4:
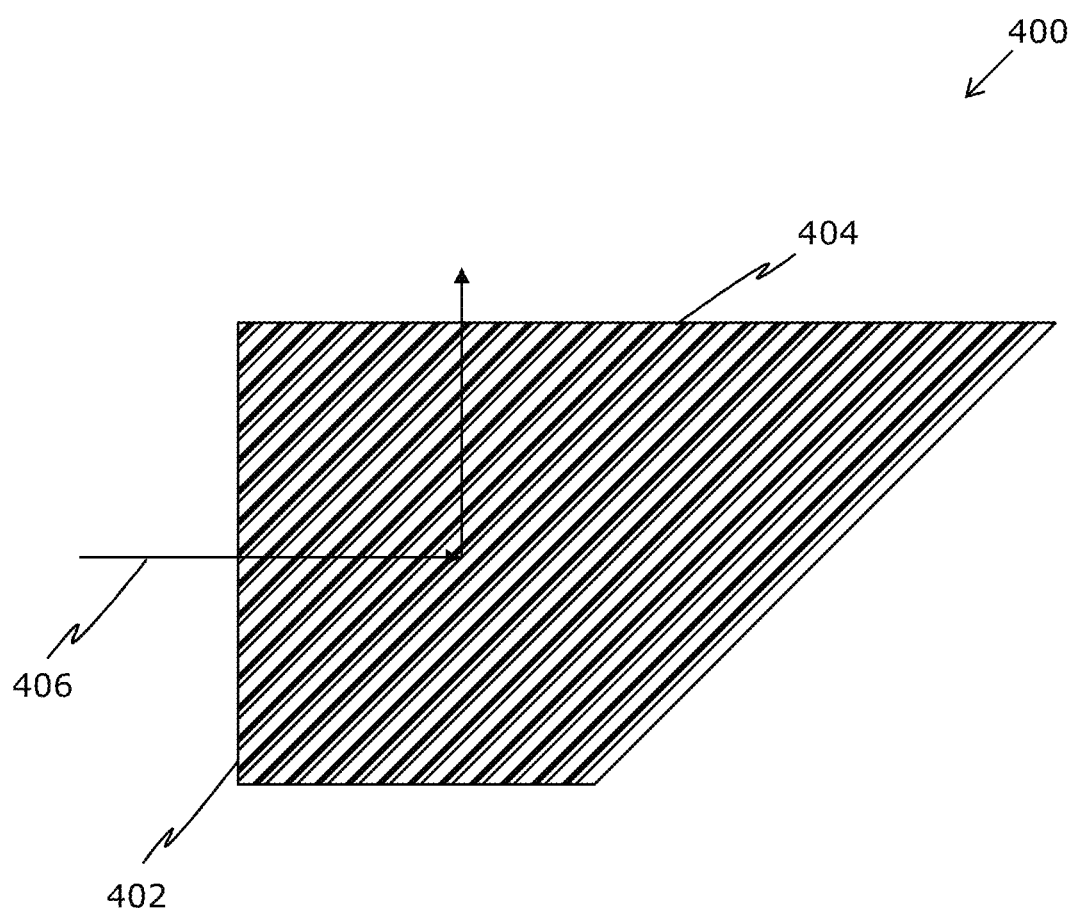
FIG. 4 is a schematic view illustration of an optical element, in accordance with yet another embodiment of the present disclosure.

FIG. 4 is a schematic view illustration of an optical element 400, in accordance with yet another embodiment of the present disclosure. The optical element 400 includes an input facet 402 and an output facet 404. A normal vector of the input facet 402 for the optical element 400 is substantially collinear with a beam of light 406 that is incident on the input facet 402. Hence, refraction of the beam of light 406 is reduced and expanded and uniformed beam of light is outputted from the output facet 406, via the optical element 400.

Figure 5A:
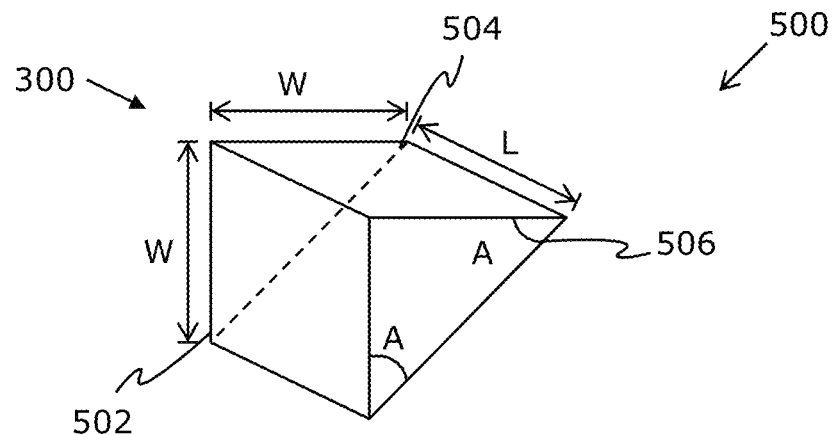
FIGS. 5A to 5E are schematic view illustrations of the optical element with exemplary depiction of its operation, in accordance with another embodiment of the present disclosure.
Figure 5B:
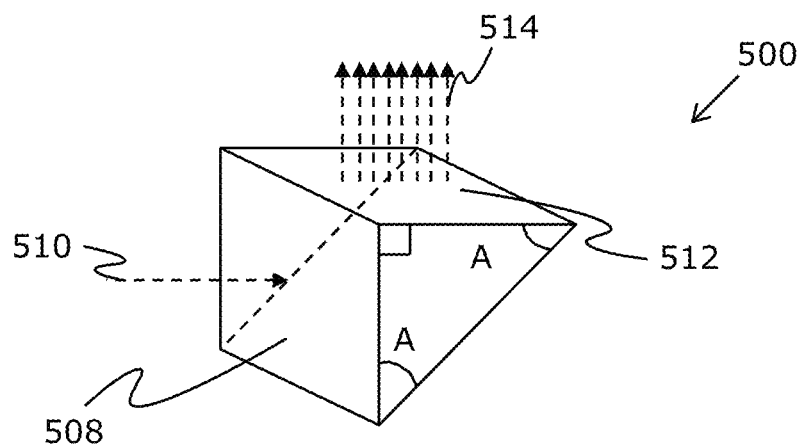
Figure 5C:
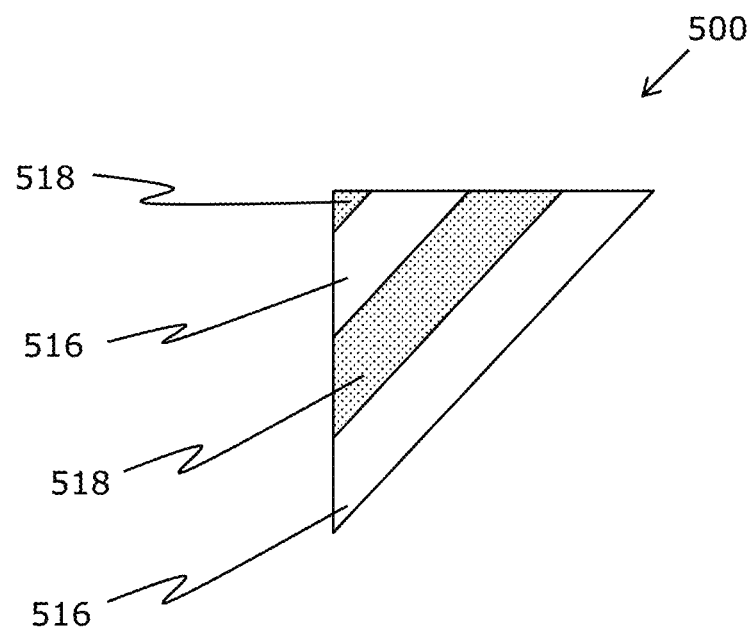
Figure 5D:
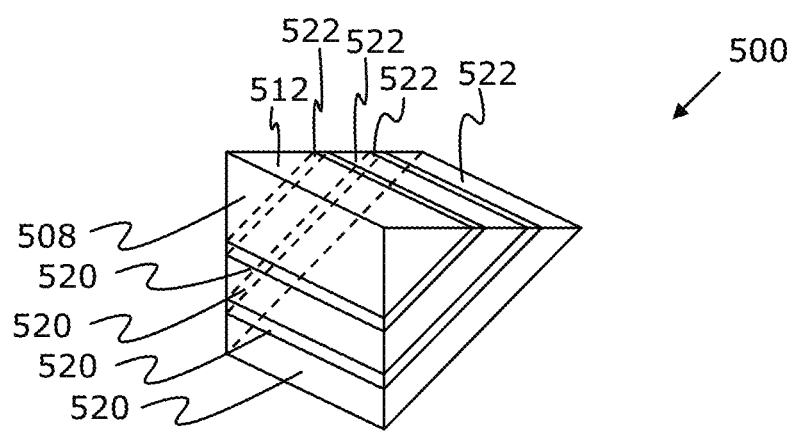
Figure 5E:
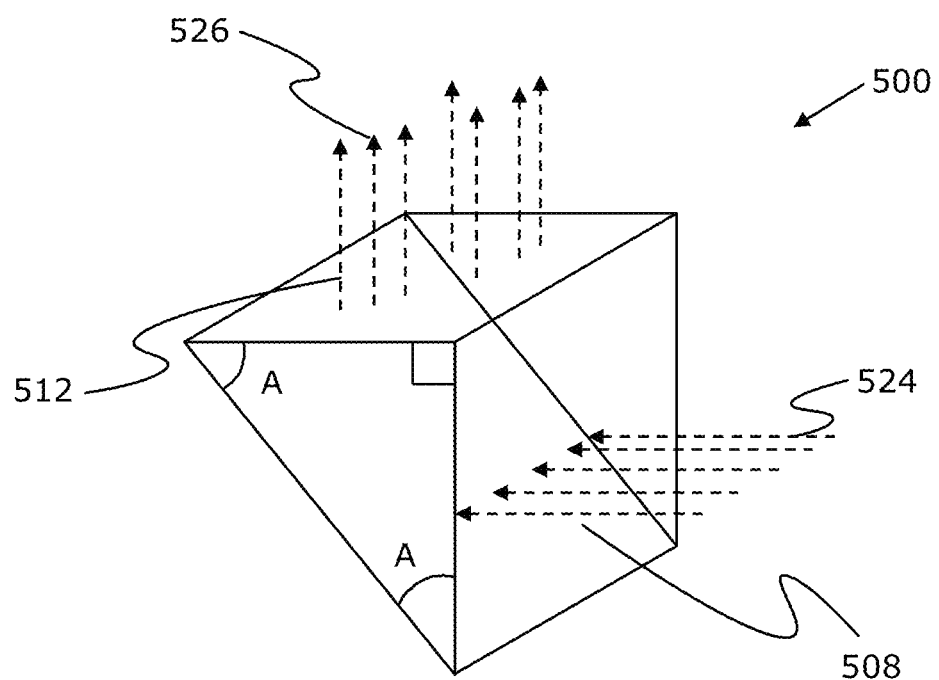

FIGS. 5A to 5E are schematic view illustrations of an optical element 500, in accordance with another embodiment of the present disclosure. Referring to FIG. 5A, an optical element 500 is a right triangular prism having a first side 502 and a second side 504 of same width 'W', and thereby providing angles 'A' of 45 degrees. The optical element 500 further has a third side 506 with a length l'. Such configuration defines a right triangular prism shape for the optical element 500. Referring to FIG. 5B, as shown, the optical element 500 implements the first face 502 as an input facet (referred by numeral 508) for receiving a beam of light 510 and the second face 502 as an output facet (referred by numeral 512) to output expanded and uniformed beam of light 514 in a first direction. Referring to FIG. 5C, there is shown a side view of the optical element 500. The optical element 500 includes a plurality of layers of a first type 516 and plurality of layers of a second type 518. Referring to FIG. 5D, the optical element 500 comprises first side edges 520 of the first and second type of layers 516, 518 that are aligned with the input facet 508 and second side edges 522 of the first and second type of layers 516, 518 that are aligned with the output facet 512. Referring to FIG. 5E, the optical element 500 (as shown) is obtained by rotating the optical element 500 as shown in FIGS. 5A to 5D. Herein, the input facet 508 is implemented for receiving a beam of light 524 and the output facet 512 is implemented for outputting an expanded and uniformed beam of light 526.

Figure 6:
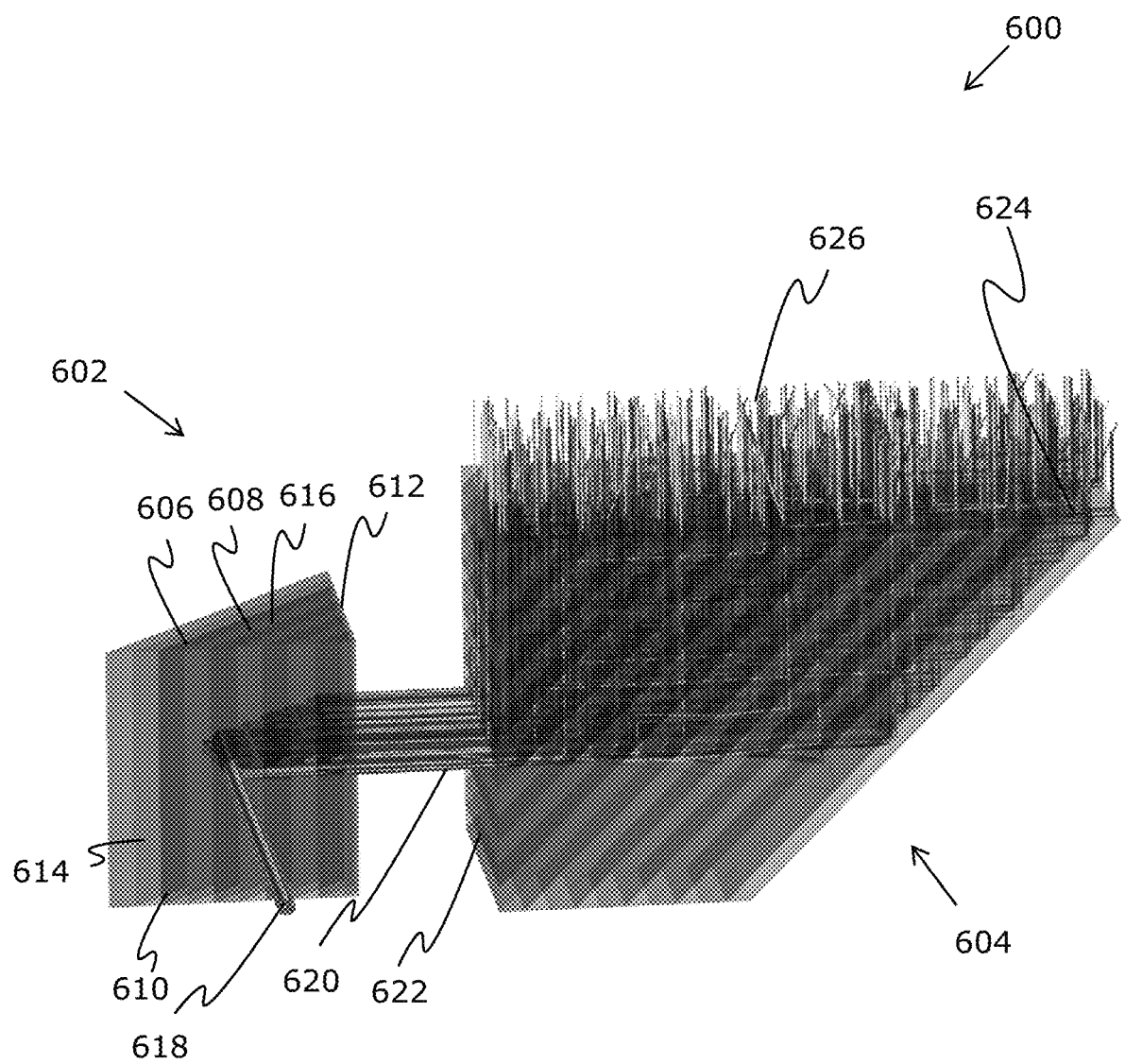
FIG. 6 is a schematic view illustration of an apparatus with exemplary depiction of its operation, in accordance with another embodiment of the present disclosure.

FIG. 6 is a schematic view illustration of an apparatus 600, in accordance with another embodiment of the present disclosure. The apparatus 600 comprises a first optical element 602 and a second optical element 604. The first optical element 602 comprises a plurality of layers of a first type 606 and the plurality of layers of a second type 608. The plurality of layers of the first type 606 and the plurality of layers of the second type 608 are arranged as a stack of layers. The stack of layers comprises an input facet 610 and an output facet 612. First side edges 614 of the first and second type of layers 606, 608 are aligned with the input facet 610 and second side edges 616 of the first and second type of layers 606, 608 are aligned with the output facet 612. The input facet 610 receives a beam of light 618 and the output facet 612 outputs an expanded beam of light 620 in a first direction. The second optical element 604 comprises an input facet 622 and output facet 624. The input facet 610 of the first optical element 602 is arranged to be orthogonal in respect to the input facet 622 and output facet 624 of the second optical element 604. The output facet 612 of the first optical element 602 faces the input facet 622 of the second optical element 604, and surfaces of the output facet 612 of the first optical element 602 and the input facet 622 of the second optical elements 604 are parallel. In this way, the second optical element 604 is arranged on an optical path of the expanded beam of light 620 to expand the expanded beam of light 620 in a second direction to form expanded and uniformed beam of light 626. Herein, the second direction is different from the first direction to enable for expanding the beam of light in two different dimensions.

Figure 7A:
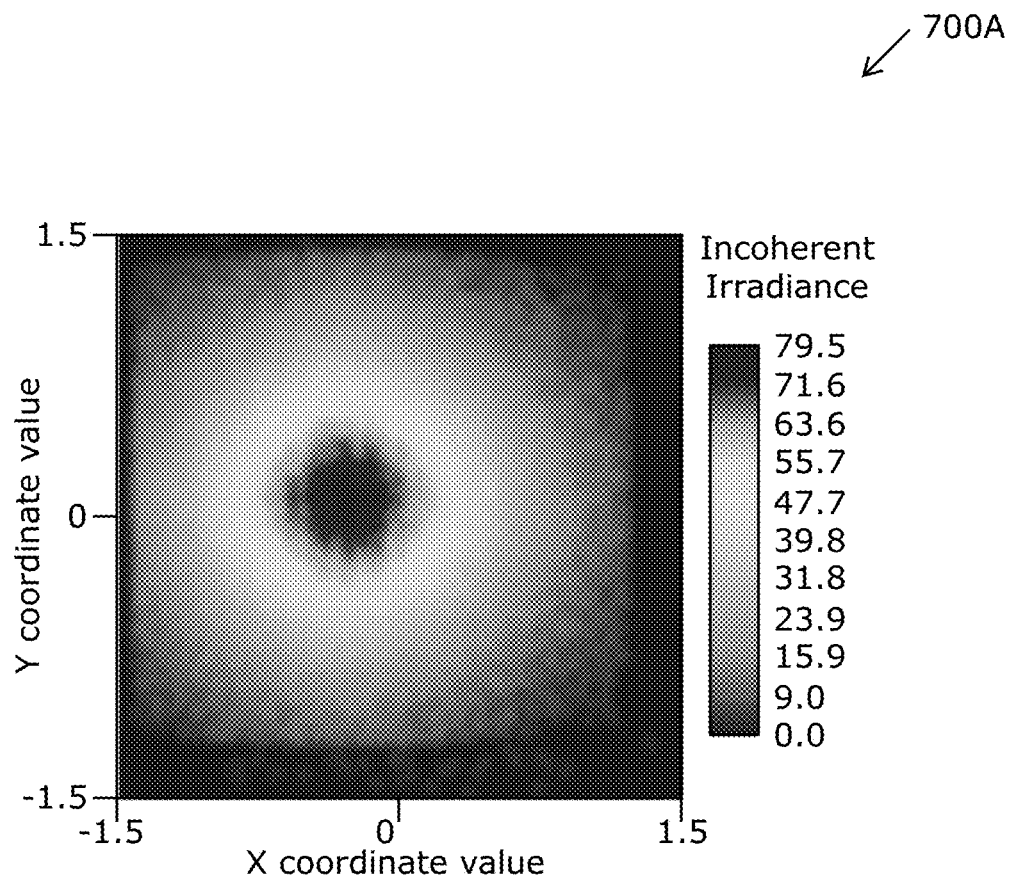
FIG. 7A is a depiction of intensity distribution plot of a beam of light entering a first optical element of the apparatus of FIG. 6, in accordance with an embodiment of the present disclosure.
Figure 7B:
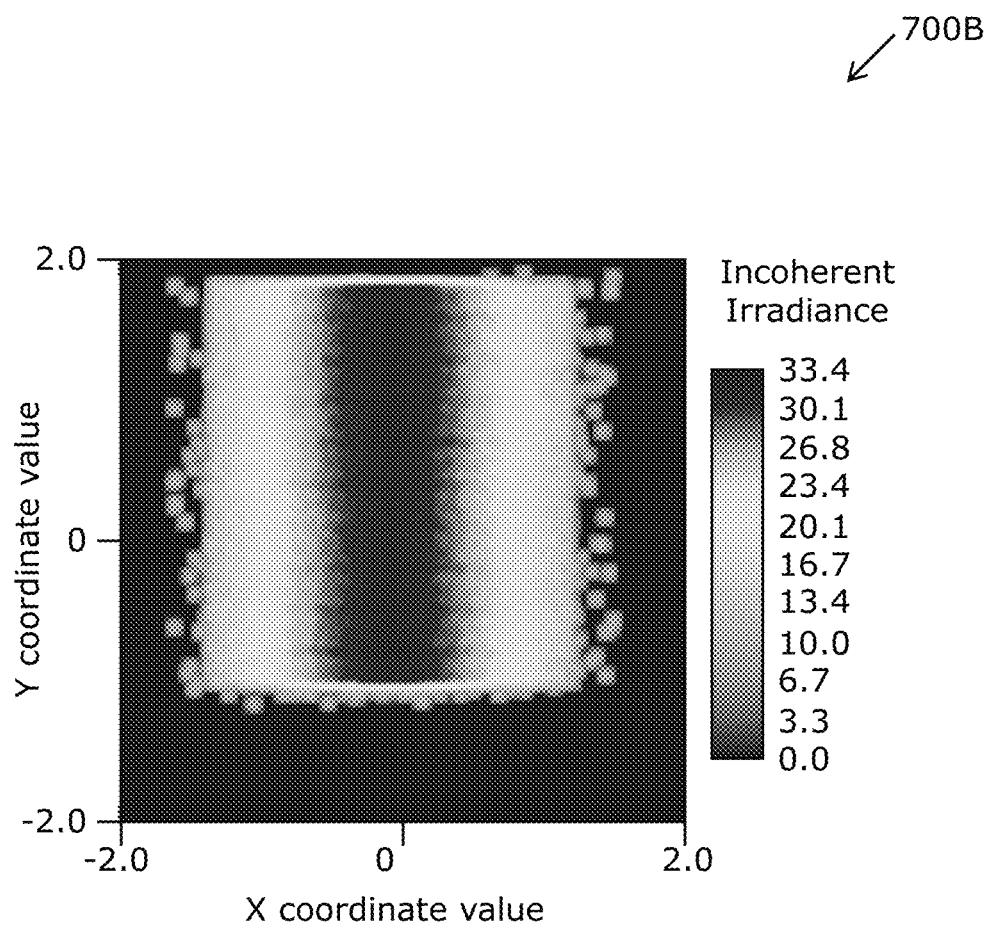
FIG. 7B is an illustration of an intensity distribution plot of an expanded beam of light after passing through the first optical element of the apparatus of FIG. 6, in accordance with an embodiment of the present disclosure.
Figure 7C:
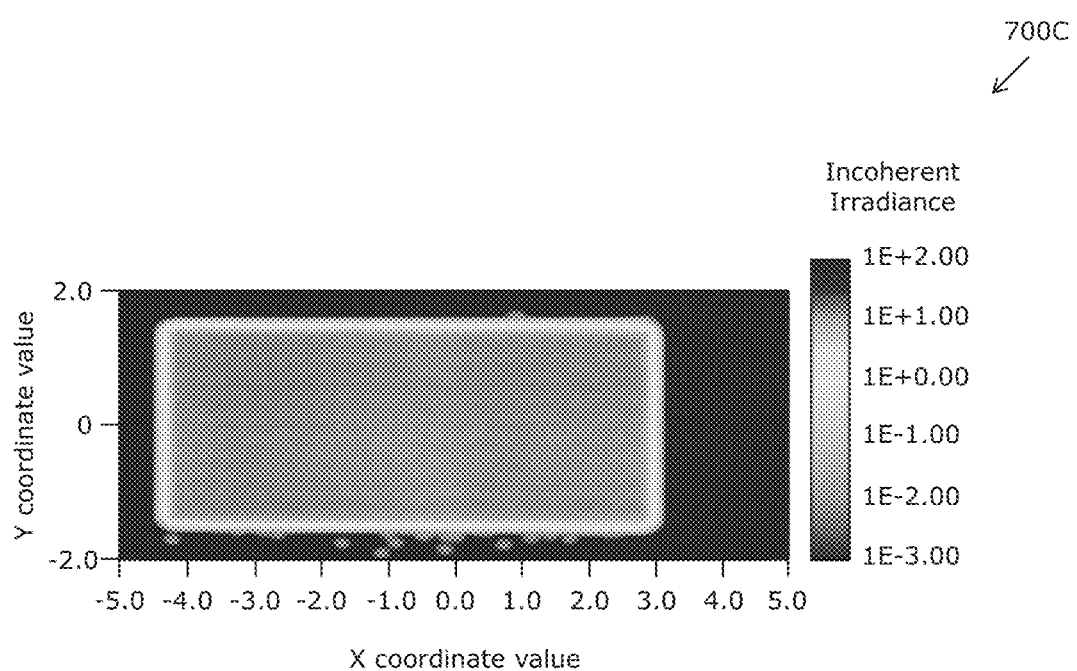
FIG. 7C is an illustration of an intensity distribution plot of an expanded and uniformed beam of light after passing through a second optical element of the apparatus of FIG. 6, in accordance with an embodiment of the present disclosure.

FIG. 7A is an illustration of an intensity distribution plot 700A of the beam of light 618 of FIG. 6, in accordance with an embodiment of the present disclosure. It may be observed from FIG. 7A, that the beam of light 618 has a more or less gaussian intensity distribution. FIG. 7B is an illustration of an intensity distribution plot 700B of the expanded beam of light 620 of FIG. 6, in accordance with an embodiment of the present disclosure. It may be observed from the intensity distribution plot 700B that the expansion and uniformization of the beam of light 618 has occurred in one dimension along the first direction. FIG. 7C is an illustration of an intensity distribution plot 700C of the expanded and uniformed beam of light 626 of FIG. 6, in accordance with an embodiment of the present disclosure. It may be observed from the intensity distribution plot 700C that the intensity distribution is uniform and the expanded and uniformed beam of light 626 has a necessary aspect ratio expanded to a size of a spatial light modulator.

Figure 8:
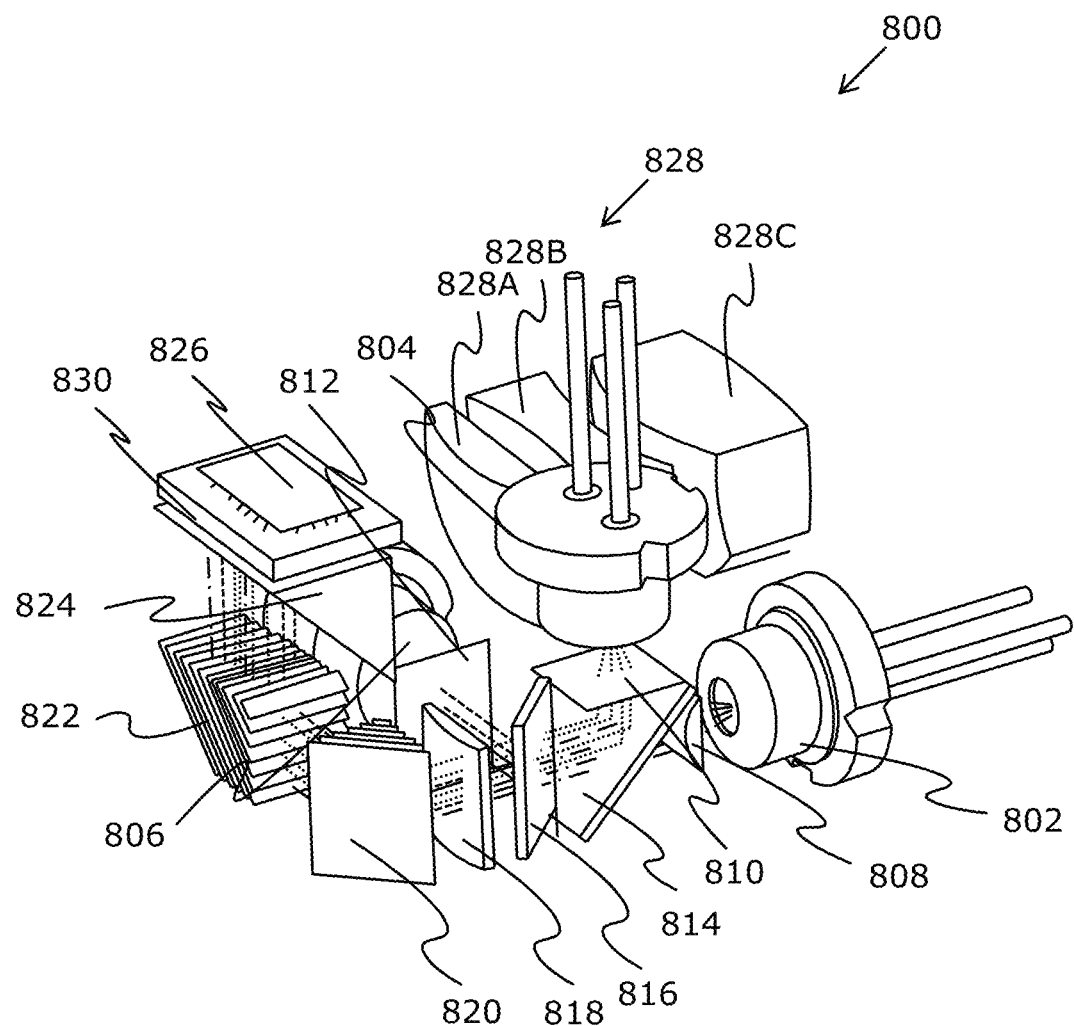
FIG. 8 is a schematic view illustration of a display device implementing the projector, in accordance with an embodiment of the present disclosure.

FIG. 8 is a schematic illustration of a display device 800, in accordance with an embodiment of the present disclosure. The display device 800 comprises a red laser diode 802, a green laser diode 804 and a blue laser diode 806 having a first optical collimator 808, a second optical collimator 810 and a third optical collimator 812. The display device 800 further comprises a first beam splitter 814, a second beam splitter 816, a collimator 818, a first optical element 820, a second optical element 822, a total internal reflection prism 824, a spatial light modulator 826, and a projection optics 828 comprising a first optical diffuser element 828A, a second optical diffuser element 828B and a third optical diffuser element 828C.

The red laser diode 802 is configured to emit the red beam of light, a green laser diode 804 is configured to emit the green beam of light and a blue laser diode 806 is configured to emit the blue beam of light. The first optical collimator 808, the second optical collimator 810 and the third optical collimator 812 limit a divergence of the red beam of light, the green beam of light and the blue beam of light on a fast axis respectively. The first beam splitter 814 and the second beam splitter 816 help in combining the red beam of light, the green beam of light and the blue beam of light on a single optical path. The first beam splitter 814 may be the band pass filter with edge between wavelengths of the green beam of light and the red beam of light. The edge of the second beam splitter 816 may be between the wavelength of the green beam of light and the blue beam of light. The collimator 818 is a cylindrical lens which collimates the beam of light on a slow axis. The first optical element 820 performs beam uniformization in the first direction and the second optical element 822 expands and uniforms the beam of light in the second direction. The total internal reflection prism 824 directs the expanded and uniform beam of light to the spatial light modulator 826. The spatial light modulator 826 includes an optical protection glass 830. The projection optics 828 comprising the first optical diffuser element 828A, the second optical diffuser element 828B and the third optical diffuser element 828C displays an image.

Figure 9:
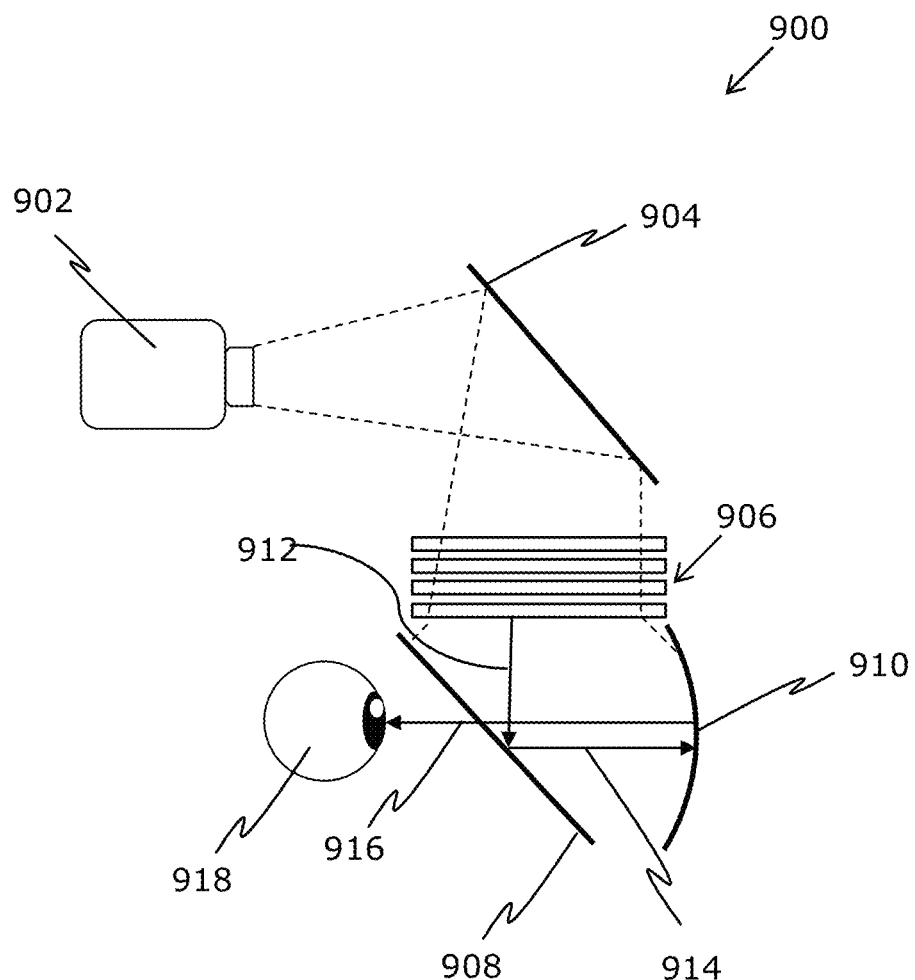
FIG. 9 is a schematic view illustration of a head-mounted display device, in accordance with an embodiment of the present disclosure.

FIG. 9 is a schematic illustration of a schematic of head-mounted display device 900, in accordance with an embodiment of the present disclosure. The head-mounted display device 900 includes a projector 902, a folding mirror 904, a projection optics 906 comprising optical diffuser elements, a first beam-splitter 908 and a second beam-splitter 910. Herein, the projector 902 comprises the optical element(s) of the present discourse for expanding and uniforming a beam of light. The expanded and uniform beam of light from the projector 902 strikes the folding mirror 904 and eventually reaches the projection optics 906 comprising optical diffuser elements. Optical diffuser element in second optical state, diffuses the received expanded and uniform beam of light, and the diffused beam of light 912 is directed towards the first beam splitter 908 which typically split the diffused beam of light 912. A reflected portion 914 of the diffused beam of light 912 is directed towards the second beam splitter 910, which is a curved optical component and, magnifies the image formed on the projection optics 906, and thereby a beam of light 916 reaches an eye 918 of a viewer forming an image thereat.

Figure 10:
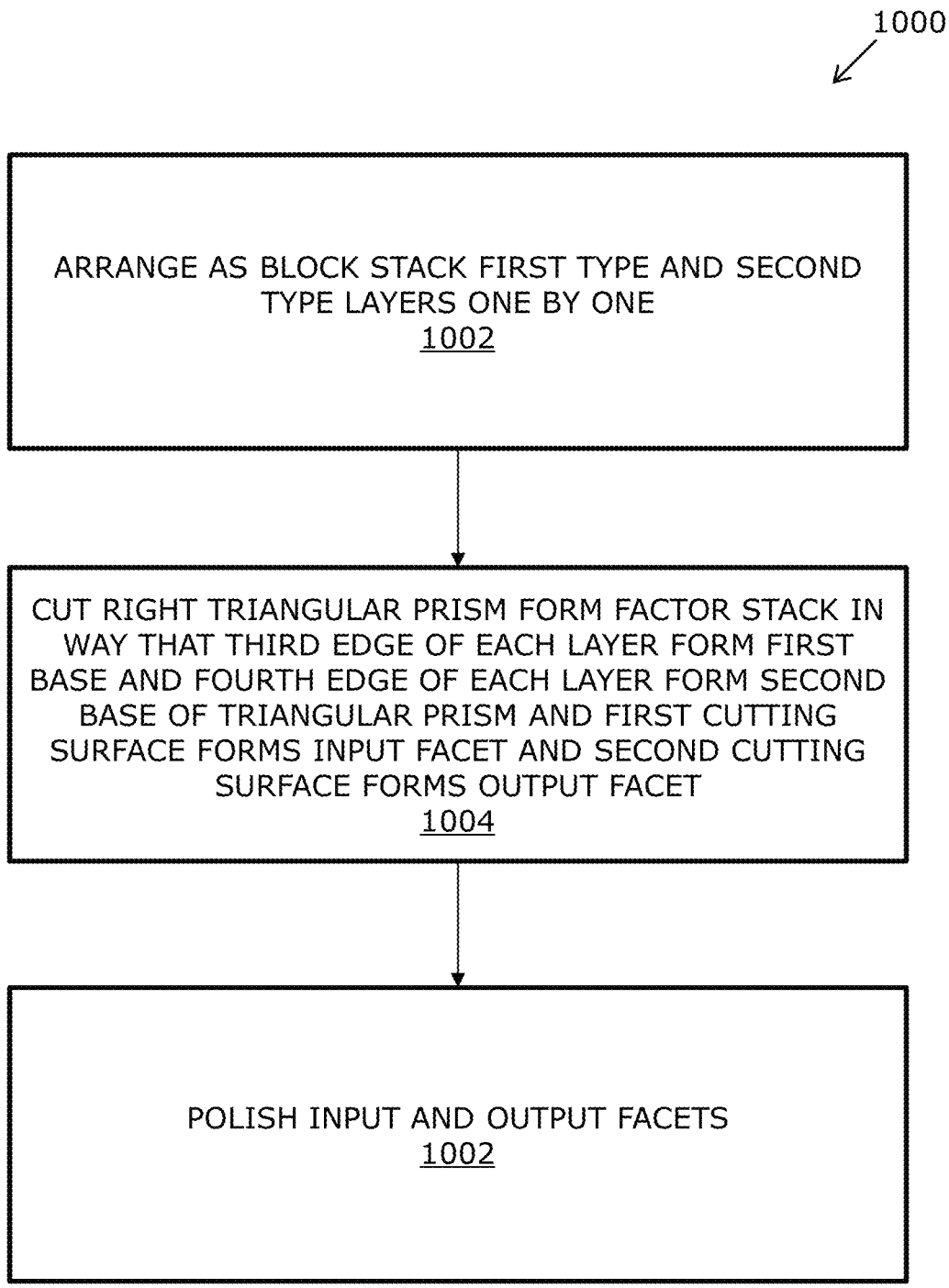
FIG. 10 is a flowchart listing steps involved in a method of manufacturing an optical element for expanding and uniforming a beam of light, in accordance with an embodiment of the present disclosure.

FIG. 10 is a flowchart 1000 listing steps involved in a method of manufacturing an optical element for expanding and uniforming a beam of light, in accordance with another embodiment of the present disclosure. The method, includes at step 1002, arranging as a block stack a first type and second type layers one by one in which the block stack of layers every second layer is of the first type and every other second layer is of the second type. The method, includes at step 1004, cutting, with a first cut and a second cuts, from the block stack a right triangular prism form factor stack in a way that a third edge of each layer form a first base of the right triangular prism and a fourth edge of each layer form a second base of the triangular prism and the first cutting surface forms an input facet and second cutting surface output facet of the optical element. The method, includes at step 1006, polishing the input and output facets.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An optical element for expanding and uniforming a beam of light comprising:
a plurality of layers of a first type and a plurality of layers of a second type, wherein the plurality of layers of the first type and the plurality of layers of the second type are arranged as a stack of layers, in which the stack of layers every second layer is of the first type and every other second layer is of the second type,
wherein:
the stack of layers comprises an input facet for receiving a beam of light and an output facet to output an expanded and uniformed beam of light, wherein first side edges of the first type of the plurality of layers and the second type of the plurality of layers are aligned with the input facet and second side edge of the first type of the plurality of layers and second type of the plurality of layers are aligned with the output facet, and
the stack of layers forms a right triangular prism in which a surface of the input facet forms a first side of the right triangular prism and a surface of the output facet forms a second side of the right triangular prism and the first side and the second side are of a same width (W), and one of surfaces of the first type of the plurality of layers forms a third side of the right triangular prism.

2. The optical element according to claim 1, wherein the first type of the plurality of layers and the second type of the plurality of layers are transparent and planar.

3. The optical element according to claim 1, wherein the first type of the plurality of layers have a first refractive index and the second type of the plurality of layers have a second refractive index different from the first refractive index.

4. The optical element according to claim 3, wherein the first refractive index is between 1.6 to 1.9 and the second refractive index is between 1.3 to 1.55.

5. The optical element according to claim 1, wherein the first type of the plurality of layers are dimensioned to be 80 to 140 times thicker than the second type of the plurality of layers.

6. The optical element according to claim 1, wherein the first type of the plurality of layers are glass and the second type of the plurality of layers are adhesive polymer.

7. The optical element according to claim 1, wherein the first type of the plurality of layers is a substrate treated on at least one side with a functional coating and the second type of the plurality of layers is an optically transparent adhesive or bonding agent.

8. The optical element according to claim 7, wherein the functional coating is at least one of: a patterned mirror structure arranged to have openings to allow at least part of received light to pass light from one layer of the first type the plurality of layers to another layer of the first type the plurality of layers and mirrored surface areas to reflect light, a multi-layer stack of dielectric, and/or a mix of dielectric and metallic thin films, forming a functional coating of a beam splitter optimized for operation within the bulk of a substrate material.

9. The optical element according to claim 7, wherein the functional coating of the beam-splitter is substantially non-polarizing.

10. The optical element according to claim 7, wherein the refractive indices of the substrate of the first type the plurality of layers and the second type the plurality of layers are substantially similar.

11. The optical element according to claim 1, wherein the stack of layers further comprises expansion layers, wherein the expansion layers comprise the first type of the plurality of layers and the second type of the plurality of layers arranged as an expansion stack in a top of the third side of the triangular prism to form the stack of layers as a trapezoidal prism.

12. The optical element according to claim 3 wherein the stack of layers further comprise at least one third type of layer with a 5-20% lower index of refraction than the second refractive index of the second type of the plurality of layers.

13. An apparatus for expanding and uniforming a light beam comprising:
a first optical element arranged on an optical path of light to expand the beam of light in a first direction; and
a second optical element arranged on the optical path of the expanded beam of light to expand the expanded beam of light in a second direction to form expanded and uniformed beam of light, wherein the second direction is different from the first direction to expand the beam of light in two different dimensions, wherein the first optical element and the second optical element comprise:
 a plurality of layers of a first type and a plurality of layers of a second type, wherein the plurality of layers of the first type and the plurality of layers of the second type are arranged as a stack of layers, in which the stack of layers every second layer is of the first type and every other second layer is of the second type,
wherein:
 the stack of layers comprises an input facet for receiving a beam of light and an output facet to output expanded and uniformed beam of light, wherein first side edges of the first type of layer and the second type of layer are aligned with the input facet and second side edge of the first type of layer and the second type of layer are aligned with the output facet, and
 the stack of layers forms a right triangular prism in which a surface of the input facet forms a first side of the right triangular prism and a surface of the output facet forms a second side of the right triangular prism and the first side and the second side are of a same width (W), and one of surfaces of the first type of layer forms a third side of the right triangular prism.

14. The apparatus according to claim 13, wherein an input facet of the first optical element is arranged to be orthogonal in respect to an input facet and an output facet of the second optical element, and an output facet of the first optical element faces the input facet of the second optical element and surfaces of the output facet of the first optical element and the input facet of the second optical elements are parallel.

15. The apparatus according to claim 13, wherein the apparatus further comprises a third optical element arranged to be orthogonal in respect to an input facet and an output facet of the second optical element and surfaces of the output facet of the second optical element is parallel with an input facet of the third optical element.

16. A projector comprising:
a light source configured to generate a beam of light;
an apparatus arranged on an optical path of the generated beam of light for expanding the generated beam of light;
a spatial light modulator arranged to receive the expanded beam of light and to modulate the expanded beam of light; and
optics for providing the modulated light to a projection optics, wherein the optics comprise:
a plurality of layers of a first type and a plurality of layers of a second type, wherein the plurality of layers of the first type and the plurality of layers of the second type are arranged as a stack of layers, in which the stack of layers every second layer is of the first type and every other second layer is of the second type,
wherein:
 the stack of layers comprises an input facet for receiving the beam of light and an output facet to output an expanded and uniformed beam of light, wherein first side edges of the first type and the second type are aligned with the input facet and second side edge of the first type and the second type are aligned with the output facet, and
 the stack of layers forms a right triangular prism in which a surface of the input facet forms a first side of the right triangular prism and a surface of the output facet forms a second side of the right triangular prism and the first side and the second side are of a same width (W), and one of surfaces of the first type of layer forms a third side of the right triangular prism.

17. The projector according to claim 16, wherein the apparatus for expanding the generated beam of light comprises:
a first optical element arranged on an optical path of light to expand the generated beam of light in a first direction; and
a second optical element arranged on the optical path of the expanded beam of light to expand the expanded beam of light in a second direction to form an expanded and uniformed beam of light, wherein the second direction is different from the first direction to expand the generated beam of light in two different dimensions.

18. The projector according to claim 16, wherein the optics for providing the modulated light to the projection optics comprises an anamorphic lens.

19. A method of manufacturing an optical element for expanding and uniforming a beam of light, the method comprising:
arranging as a block stack a first type and second type of layers one by one in which the block stack every second layer is of the first type and every other second layer is of the second type;
cutting, with a first cut and a second cuts, from the block stack, a right triangular prism form factor stack in a way that a third edge of each layer form a first base of the right triangular prism and a fourth edge of each layer form a second base of the triangular prism and a first cutting surface forms an input facet and a second cutting surface forms an output facet of the optical element; and
polishing the input facet and the output facets.

20. The method according to claim 19, wherein method further comprising coating the input facet and the output facets with an anti-reflective coating.

* * * * *